United States Patent
Leidel et al.

(10) Patent No.: US 11,922,148 B2
(45) Date of Patent: Mar. 5, 2024

(54) SYSTEMS AND METHODS FOR APPLICATION PERFORMANCE PROFILING AND IMPROVEMENT

(71) Applicant: Tactical Computing Laboratories, LLC, Muenster, TX (US)

(72) Inventors: John D. Leidel, Muenster, TX (US); David Donofrio, San Francisco, CA (US); Ryan Kabrick, New Castle, DE (US)

(73) Assignee: Tactical Computing Laboratories, LLC, Muenster, TX (US)

( * ) Notice: Subject to any disclaimer, the term of this patent is extended or adjusted under 35 U.S.C. 154(b) by 130 days.

(21) Appl. No.: 17/645,277

(22) Filed: Dec. 20, 2021

(65) Prior Publication Data

US 2023/0195436 A1 Jun. 22, 2023

(51) Int. Cl.
*G06F 8/41* (2018.01)

(52) U.S. Cl.
CPC .............. *G06F 8/433* (2013.01); *G06F 8/443* (2013.01); *G06F 8/456* (2013.01)

(58) Field of Classification Search
CPC ........................................................ G06F 8/433
USPC ........................................................ 717/156
See application file for complete search history.

(56) References Cited

U.S. PATENT DOCUMENTS

| | | | | |
|---|---|---|---|---|
| 9,720,743 | B2* | 8/2017 | Yu | G06F 8/4441 |
| 9,727,377 | B2* | 8/2017 | Martinez Canedo | G05B 19/056 |
| 9,798,527 | B1* | 10/2017 | Bendersky | G06F 8/433 |
| 10,025,566 | B1* | 7/2018 | Ahmed | G06F 8/4452 |
| 10,402,176 | B2* | 9/2019 | Glossop | G06F 8/441 |
| 10,466,988 | B2* | 11/2019 | Toper | G06F 9/3836 |
| 10,496,383 | B2* | 12/2019 | Zhang | G06F 8/433 |
| 10,901,715 | B1* | 1/2021 | Raiman | G06F 9/4552 |
| 2012/0324454 | A1 | 12/2012 | Gounares et al. | |
| 2016/0283346 | A1 | 9/2016 | Kriegsman et al. | |
| 2019/0042216 | A1 | 2/2019 | Zhang | |
| 2019/0278593 | A1* | 9/2019 | Elango | G06F 8/447 |
| 2023/0039180 | A1* | 2/2023 | Luitjens | G06F 9/4484 |

FOREIGN PATENT DOCUMENTS

WO  WO-2023072386 A1 * 5/2023

OTHER PUBLICATIONS

Alexandre Bardakoff et al. "Hedgehog: Understandable Scheduler-Free Heterogeneous Asynchronous Multithreaded Data-Flow Graphs"; 2020 IEEE/ACM 3rd Annual Parallel Applications Workshop: Alternatives to MPI+X (PAW-ATM).*
Marcin Copik et al. "Extracting Clean Performance Models from Tainted Programs"; PPoPP '21, Feb. 27-Mar. 3, 2021, Virtual Event, Republic of Korea.*

(Continued)

*Primary Examiner* — Francisco J Aponte

(57) ABSTRACT

Methods for analyzing and improving a target computer application and corresponding systems and computer-readable mediums. A method includes receiving the target application. The method includes generating a parallel control flow graph (ParCFG) corresponding to the target application. The method includes analyzing the ParCFG by the computer system. The method includes generating and storing the modified ParCFG for the target application.

18 Claims, 23 Drawing Sheets

(56) References Cited

OTHER PUBLICATIONS

Ole Klein "Object-Oriented Programming for Scientic Computing Template Metaprogramming"; Interdisciplinary Center for Scientic Computing Heidelberg University—Jun. 30, 2015.*

Marcelo Pasin " D4.4 "Report on Energy-Efficiency Evaluations and Optimizations for Energy-Efficient, Secure, Resilient Task-Based Programming Model and Compiler Extensions—Version 2"; Low Energy Toolset for Heterogeneous Computing—Nov. 30, 2020.*

Adilla Susungi and Claude Tadonki. 2020. Intermediate Representations for Explicitly Parallel Programs. ACM Comput. Surv. 54, 5, Article 100 (May 2021), 24 pages. https://doi.org/10.1145/3452299.*

Chenle Yu et al. "OpenMP to CUDA graphs: a compiler-based transformation to enhance the programmability of NVIDIA devices"; SCOPES '20, May 25-26, 2020, Sankt Goar, Germany.*

Sara Royuela et al. "Parallel programming issues and what the compiler can do to help"; 2nd BSC Internation Doctoral Symposium—BArcelona 2015.*

Streit et al., "Sambamba: A Runtime System for Online Adaptive Parallelization", International Conference on Compiler Construction, Mar. 24-Apr. 1, 2012, 15 pages.

Farrell, "The Fast Guide to Application Profiling", Red Gate Software Ltd., Apr. 22, 2010, 30 pages.

Liu et al., "Profiling and Improving I/O Performance of a Large-Scale Climate Scientific Application", 2013 22nd International Conference on Computer Communication and Networks, Aug. 2, 2013, 20 pages.

International Search Report and Written Opinion of the International Searching Authority dated Mar. 31, 2023 in connection with International Patent Application No. PCT/US2022/081435, 8 pages.

Edwards et al., "Kokkos: Enabling manycore performance portability through polymorphic memory access patterns" Sandia National Laboratories, Albuquerque, NM, Journal of Parallel and Distributed Computing, Jul. 7, 2014, 21 pages.

Slaughter et al., "Regent: A High-Productivity Programming Language for HPC with Logical Regions", SC '15, Nov. 15-20, 2015, Austin, TX, USA, 12 pages.

Slaughter, "Regent: A High-Productivity Programming Language for Implicit Parallelism with Logical Regions", Dissertation Submitted to The Department of Computer Science and The Committee on Graduate Studies of Stanford University, Aug. 2017, 147 pages.

Bachan et al., "UPC++: A High-Performance Communication Framework for Asynchronous Computation", 2019 IEEE International Parallel and Distributed Processing Symposium (IPDPS), May 20-24, 2019, 11 pages.

"UPC++ v1.0 Specification Revision 2020.3.0" Lawrence Berkeley National Laboratory Technical Report (LBNL-2001268), UPC++ Specification Working Group, Mar. 12, 2020, 167 pages.

* cited by examiner

SYSTEMS AND METHODS FOR APPLICATION PERFORMANCE PROFILING AND IMPROVEMENT

GOVERNMENT LICENSE RIGHTS

This invention was made with government support under DE-SC0021527 awarded by the United States Department of Energy. The government has certain rights in the invention.

TECHNICAL FIELD

The present disclosure is directed, in general, to analysis and improvement of application code, in particular code indented to run on high-performance computing (HPC) devices.

BACKGROUND OF THE DISCLOSURE

Recent efforts by the Department of Energy and Department of Defense have increased visibility and development efforts in template metaprogramming approaches for high performance computing. The goal of these template metaprogramming techniques is to provide users a common, C++-based language and application programming interface (API) for users to create high performance, portable parallel applications that have the ability to execute (in a high-performance manner) in a multitude of different HPC platforms. These template metaprogramming language constructs mask the underlying hardware architecture using platform-agnostic parallel keywords. For example, a given code construct can be executed on a standard CPU, GPU or other computing by simply defining and targeting different policies.

These template metaprogramming techniques have inherent weaknesses. For example, this performance portability can be achieved assuming that the user has a deep grasp of both the template metaprogramming environment and the underlying hardware architecture. This is often not the case given that the individuals writing the applications are domain experts and not computer architects or compiler experts. As another example, there are currently no tools to analyze the potential performance of various template metaprogramming techniques at compile time. Given the inherent design goal of template metaprogramming techniques to hide device-specific implementation details, this implies that users are required to write, compile and subsequently execute the applications in order to detect issues in parallelism, memory layout, performance optimization and race conditions. Improved systems are desirable.

SUMMARY OF THE DISCLOSURE

Various disclosed embodiments include systems and method to build and analyze performance, memory, and race condition issues in parallel applications at compile time written using one or more template metaprogramming techniques in a language agnostic manner.

Disclosed embodiments can be implemented using a Multi-Environment Template API (META) in order to provide compile-time performance analysis for applications using C++ template meta-programming models. Various embodiments can employ a "parallel control flow graph" (ParCFG) which encapsulates a directed acyclic graph (DAG) representation of the execution of a parallel application containing nodes, directed vertices and vertex metadata. The discovery and constructing of the ParCFG can be performed at compile time using the template meta-programming language specific keywords in a language agnostic manner. Various embodiments can perform analysis of the functionality, performance, stability and memory layout of the target parallel application using language agnostic graph analysis techniques, and use the results of the analysis to improve the application itself.

Disclosed embodiments include methods for analyzing and improving a target computer application and corresponding systems and computer-readable mediums. A disclosed method includes receiving the target application. The method includes generating a parallel control flow graph (ParCFG) corresponding to the target application. The method includes analyzing the ParCFG by the computer system. The method includes generating and storing the modified ParCFG for the target application.

In various embodiments, the method also includes generating and storing a modified application according to the modified ParCFG. In various embodiments, the ParCFG is a directed acyclic graph including vertices and directed edges that represent sequential and parallel processes performed by the target application. In various embodiments, at least one vertex includes metadata attributes describing at least one of execution type, parallel width, device type, memory type, or memory transforms. In various embodiments, analyzing the ParCFG includes at least one of analyzing serialization of the application, analyzing nested parallelism of the application, analyzing memory transforms of the application, analyzing parallel width of the application, or analyzing device dispatch of the application. In various embodiments, modifying the ParCFG includes at least one of correcting dispatch ordering, reverting deeply nested parallel constructs to sequential operation, triggering adjacent parallel regions to execute concurrently, fusing multiple parallel region nests into a singular parallel dispatch, parallelizing sequential regions that have no external data dependencies, removing unnecessary barrier synchronization primitives, or adjusting data transformations to ensure correct memory alignment and layout.

Disclosed embodiments also include a computer system having at least one processor and a memory accessible by the processor(s). The memory stores executable code, and the processor(s) are configured to execute the executable code to perform processes as described herein. Disclosed embodiments also include a non-transitory computer-readable medium encoded with executable instructions which, when executed by one or more processors, cause the one or more processors to perform processes as described herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include novel systems and methods for application performance profiling and improvement. Specific embodiments employ parallel control and data flow graphs for efficient and accurate analysis of application performance, and the results of the analysis are used to improve the function and efficiency of the applications, providing a distinct technical improvement the operation of the computer system itself when executing an application.

The disclosure below includes a discussion of parallel control flow graphs, their construction by the system, and the way the system can use the parallel control flow graphs to analyze a parallel-processing application at compile time. Further, the disclosure below describes various resulting actions that can be taken by the system, according to the analysis, to improve the application code and its functions.

Illustrative Operating Environment

The execution of various processes described herein may be implemented using computer-executable software instructions executed by one or more programmable computing devices (collectively, "computers"). Because these processes may be implemented using software instructions, the components and operation of a generic programmable computer system on which various embodiments of these processes may be employed will first be described. Further, because of the complexity of some of the operations performed by the disclosed system, as well as the complexity of the application being analyzed, these processes can be configured to operate on a computing system capable of simultaneously running multiple processing threads. The components and operation of a computer system having a host or master computer and one or more remote or slave computers therefore will be described with reference to FIG. 1. This operating environment is only one example of a suitable operating environment, however, and is not intended to suggest any limitation as to the scope of use or functionality of any implementations of the invention.

Figure 1:
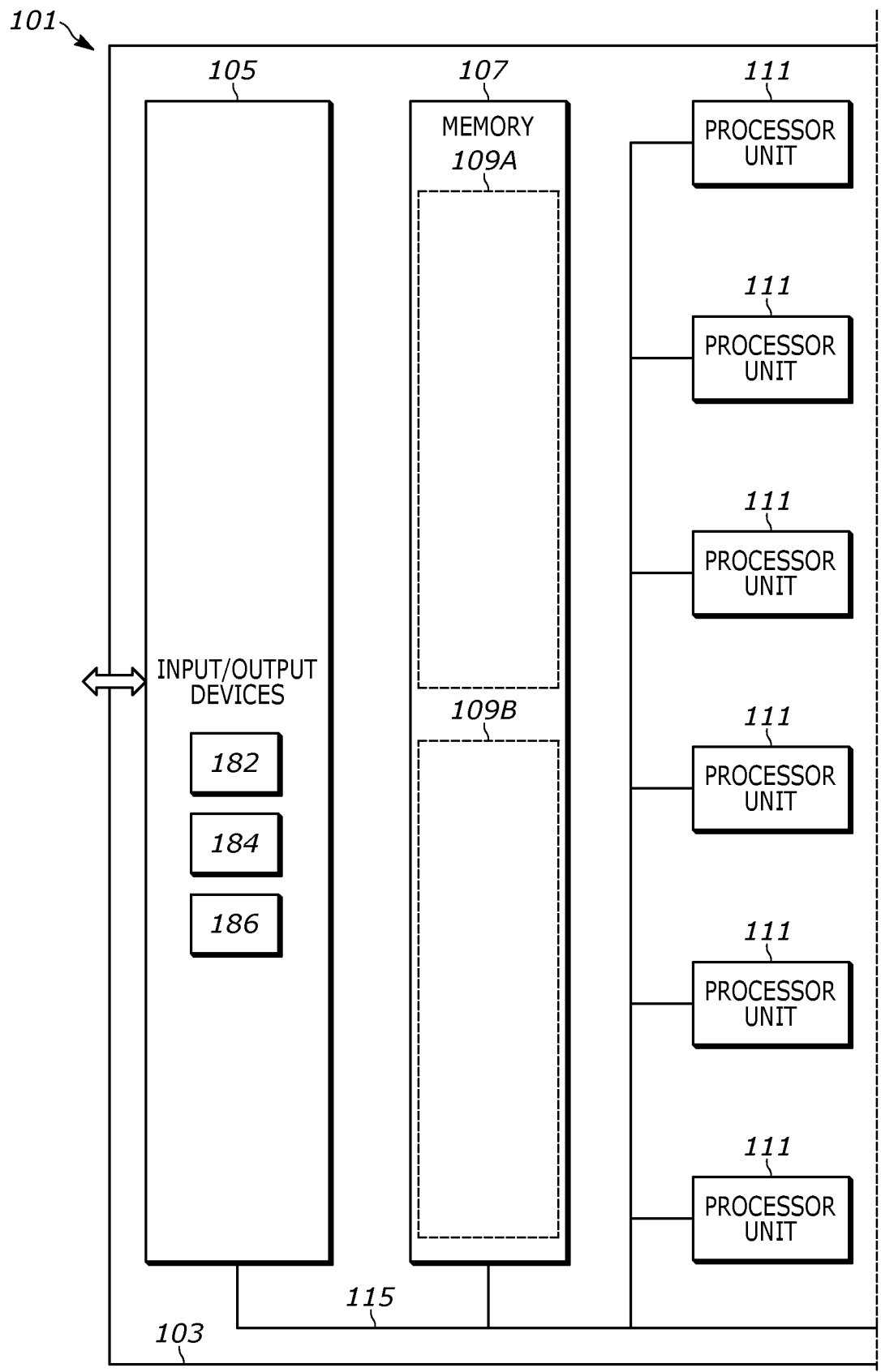
FIGS. 1 and 2 illustrate components of a computer system that may be used to implement various embodiments of the current disclosure.
Figure 1:
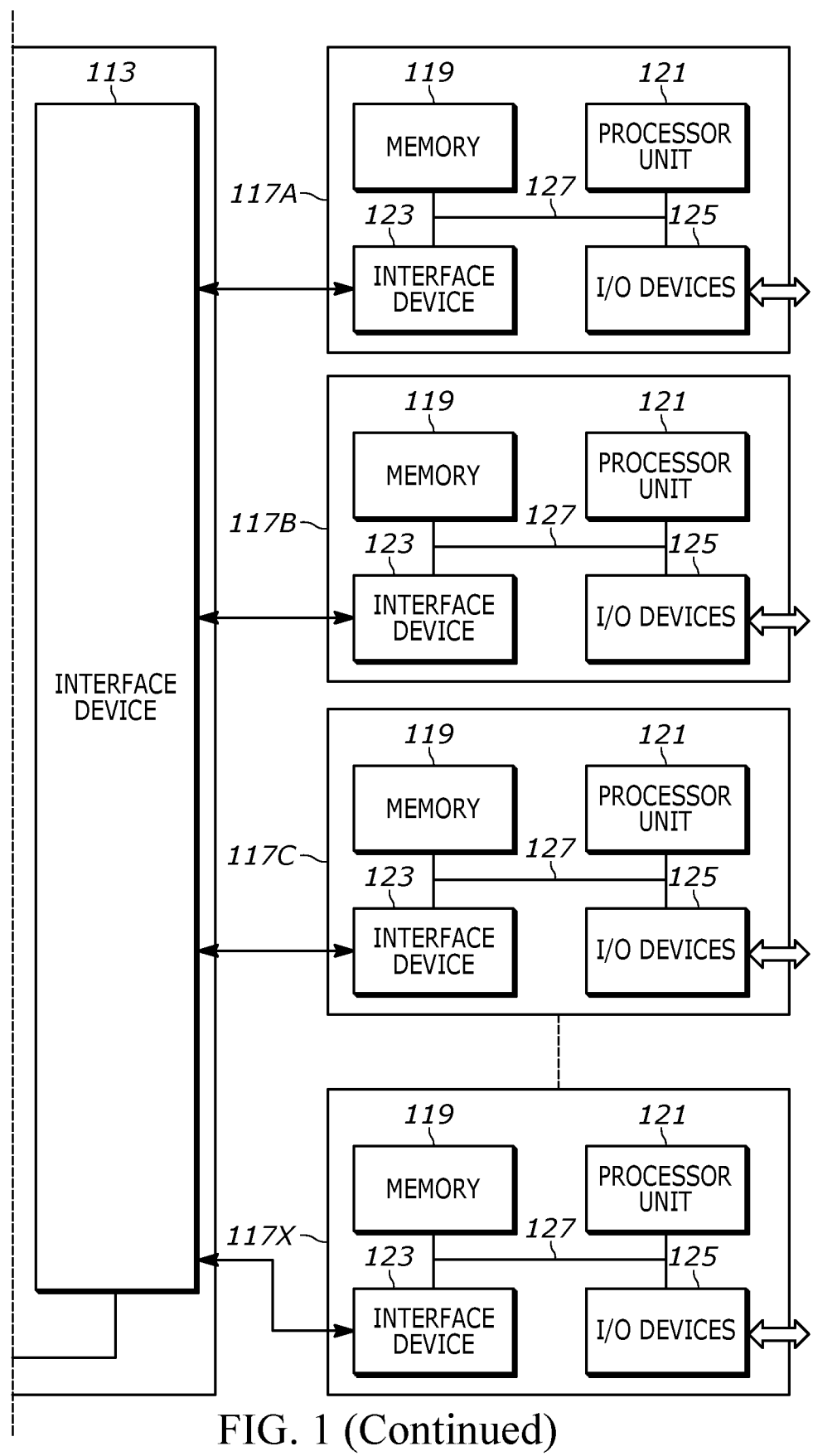

In FIG. 1, the computer system 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other non-transitory storage medium that can be used to store desired information. As used herein, the term "non-transitory" refers to the ability to store information for subsequent retrieval at a desired time, as opposed to propagating electromagnetic signals.

As will be discussed in detail below, the master computer 103 runs a software application for performing one or more operations according to various examples of the disclosed embodiments. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel. Data 109B can also specifically include data related to processes described herein, such as applications 182 (which can include target applications/code and modified applications/code), ParCFGs 184, and other data 186 that can include any other data as described herein or used in implementing the processes described below.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® CORE® or Xeon™ microprocessors, Advanced Micro Devices RYZEN™ microprocessors or Motorola 68K/Coldfire®. microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
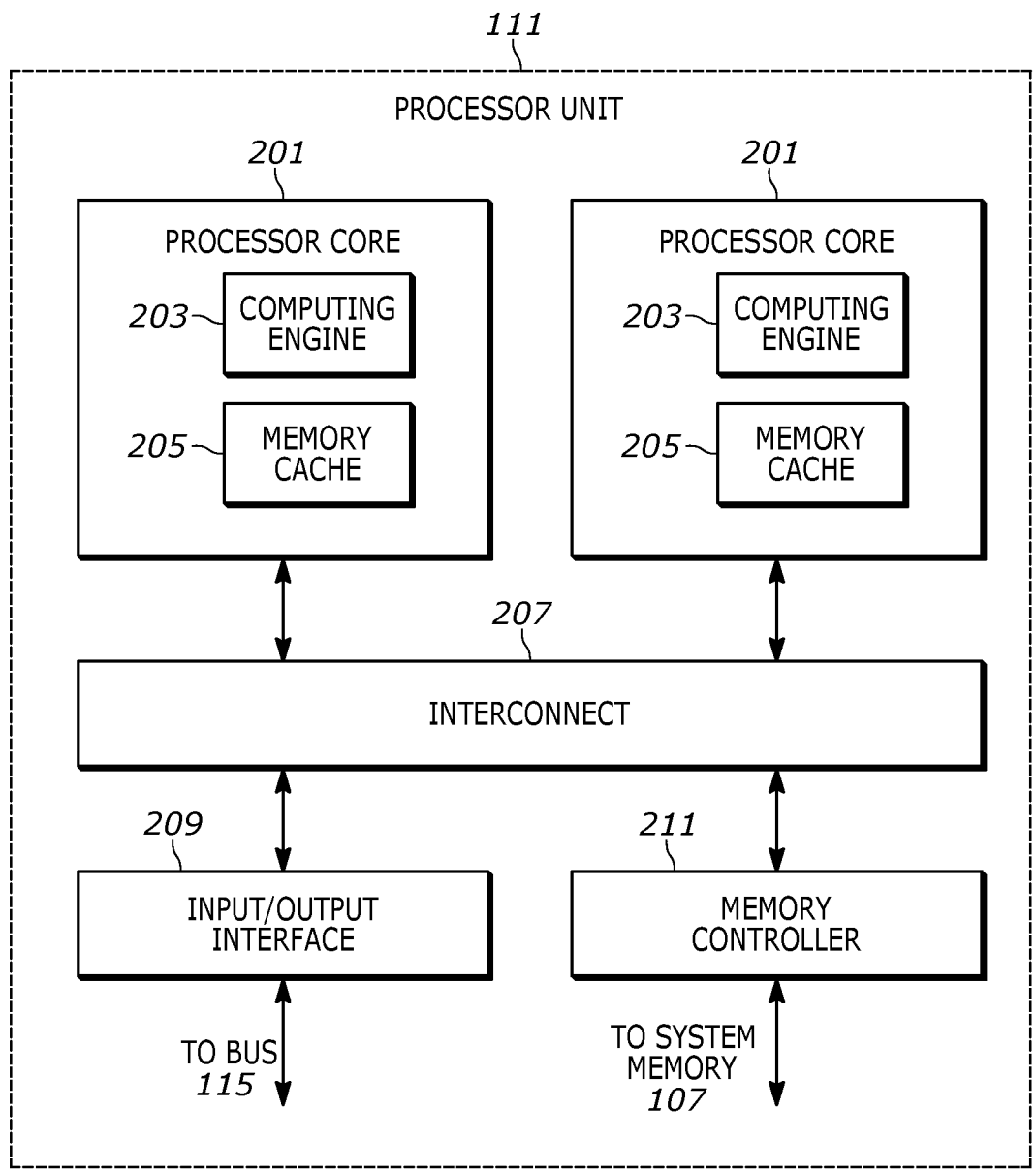

With some implementations of the invention, the master computer 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation, and IBM Corporation, the interconnect 207 may be implemented as an interconnect bus. With other processor units 201, however, such as the multi-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only and is not intended to be limiting. It also should be appreciated that, with some implementations, a multi-core processor unit 111 can be used in lieu of multiple, separate processor units 111. For example, rather than employing six separate processor units 111, an alternate implementation of the computing system 101 may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 123, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel®. Pentium®. or Xeon™ microprocessors, Advanced Micro Devices Athlon™ microprocessors or Motorola 68K/Coldfire®. microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the technology may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the computer system 101, the master computer 103 may be connected to one or more external data storage devices. These external data storage devices may be implemented using any combination of non-transitory computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the computer system 101, one or more of the slave computers 117 may alternately or additions be connected to one or more external non-transitory data storage devices. Typically, these external non-transitory data storage devices will include data storage devices that also are connected to the master computer 103, but they also may be different from any data storage devices accessible by the master computer 103.

It also should be appreciated that the description of the computer system 101 illustrated in FIG. 1 and FIG. 2 is provided as an example only, and it not intended to suggest any limitation as to the scope of use or functionality of various embodiments of the invention.

Parallel Control Flow Graphs

Disclosed embodiments can implement a Parallel Control Flow Graph, or ParCFG. Control flow graphs have been traditionally utilized in compiler tool chains and analysis tools to represent the control flow execution of a target piece of code or application. This implies that the control flow graph tracks how memory items interact with arithmetic operations and control flow operations (branches, conditionals, etc). Normally, these control flow graphs represent every data item and operation. However, disclosed embodiments can specifically create a control flow graph of parallel application flow. The ParCFG is designed to track the execution of nested parallel codelets as they interact with parallel-local and application-global memory.

A ParCFG, as used herein, can be defined as a directed acyclic graph (DAG) that includes vertices (also referred to as "nodes") and directed edges. Vertices may also include associated metadata that define additional application-related details. The graph (G) can be defined as containing a set of vertices (V) and adjacent edges (A) such that G=(V,A) and v∈V. Further, the outdegree (outgoing edges) of a target vertex (v) can be described as $deg^+(v)$ and the indegree (incoming edges) of a target vertex (v) can be described as $deg^-(v)$.

Figure 3:
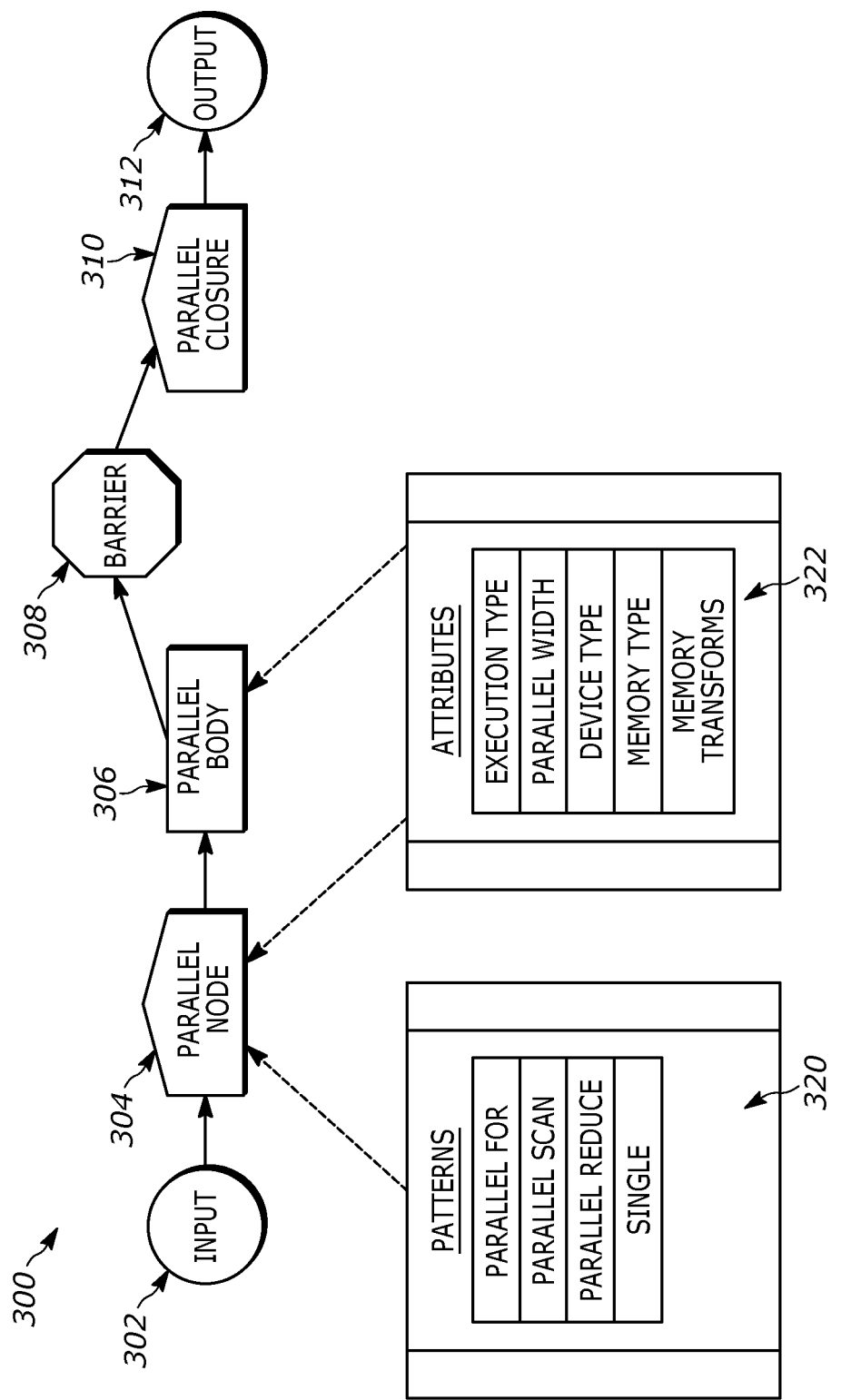
FIG. 3 illustrates a simple parallel control flow graph 300 in accordance with disclosed embodiments.

FIG. 3 illustrates a simple parallel control flow graph 300 in accordance with disclosed embodiments. Disclosed embodiments can use six types of vertices that can be described as follows:

Input Vertices 302: Input vertices define the start of an application. This can be considered the root node of the ParCFG DAG. Each graph has a single input vertex 302. No parallel constructs precede the input vertices. Input vertices may have an infinite number of outgoing directed edges, so that:

Outdegree: $deg^+(v)=\infty$

Indegree: $deg^-(v)=0$

Output Vertices 312: Output vertices define the end of a parallel application. This can be considered the final closure of the DAG. Each graphs has a single output vertex 312. No parallel constructs may follow the output vertex. Output vertices may have an infinite number of incoming directed edges, so that:

Outdegree: $deg^+(v)=0$

Indegree: $deg^-(v)=\infty$

Parallel Vertices 304: Parallel vertices represent a parallel dispatch in an application. This implies that the application contains a language specific construct that is designed to explicitly enable parallel or sequential execution. It may also include parallel pattern hints, target-device hints, target memory hints and memory transform hints in the associated vertex metadata. Parallel vertices may represent changes in execution targets from one device type to another. For each parallel vertex 304:

Outdegree: $deg^+(v)=1$

Indegree: $deg^-(v)=1$

Parallel Body Vertices 306: Parallel body vertices represent the actual code to be executed by each parallel unit. This includes each unit's memory inputs and outputs. Parallel body nodes may also have any number of metadata attributes as described herein. For each parallel body vertex 306:

Outdegree: $deg^+(v)=\infty$

Indegree: $deg^-(v)=1$

Barrier Vertices 308: Barrier vertices are special types of parallel vertices. Barrier vertices imply that one or more parallel body and/or parallel vertices cannot proceed until they all reach the barrier point. In which case, the barrier is only satisfied when all indegree vertices have reached the barrier before any of the parallel units are permitted to proceed. For each barrier vertex 308:

Outdegree: $\deg^+(v) = \infty$

Indegree: $\deg^-(v) = \infty$

Parallel Closure Vertices 310: Parallel Closure vertices represent the completion of a parallel dispatch. This implies that the execution of one or more parallel bodies has completed and program execution may continue to the next graph vertex. Parallel Closure nodes may also represent changes in execution targets from one device type to another. For each parallel closure vertex 310:

Outdegree: $\deg^+(v) = 1$

Indegree: $\deg^-(v) = \infty$

In addition to the vertex types described above, vertices may also include a set of metadata tags to represent template metaprogramming agnostic concepts. These metadata tags are encapsulated, in various embodiments, as metadata patterns 320 and metadata attributes 322. Patterns 320 represent parallel execution patterns as prescribed by the template metaprogramming keywords. These can include the following patterns:

Parallel For: Parallel for patterns represent traditional fork-join style parallelism where each index of a for loop is executed uniquely by one or more parallel execution units Parallel Scan: Parallel scan patterns analyze in a pre-order or post-order manner the parallel memory items provided to the parallel body node.

Parallel Reduce: Parallel reduce patterns receive parallel memory items as input and produce a single output that is reduced using a prescribed operator. Examples of this include adding all the elements in an array.

Single: Single patterns within a parallel construct imply that only one parallel execution element should execute the parallel body defined by the outward edge of the vertex. This ensures that only one parallel unit executes the target code.

Metadata attributes 322 are associated with parallel or parallel body vertices in order to describe specific programmatic functionality in a language agnostic manner. Metadata attributes 322 can include the following types of metadata:

Execution Type: Execution type attributes define the policies by which to direct the creation and timing of parallel body vertex executions.

Parallel Width: Parallel width attributes define the number of parallel body vertices to execute in parallel within the given parallel region.

Device Type: Device type attributes define the target physical device for which to execute the target set of parallel body vertices.

Memory Type: Memory type attributes define the target physical memory medium for which to place incoming and/or outgoing memory blocks.

Memory Transforms: Memory transforms imply that the organization of the input data is modified in a prescribed manner in order to provide higher performance access throughout the parallel body execution.

In addition to the exemplary simple graph illustrated in FIG. 3, more complex graphs can be constructed using nested parallel code. In this manner, applications that have multi-dimensional parallel constructs (e.g., two-dimensional (2D) or three-dimensional (3D) loops) can be represented with nested sets of graph vertices.

Figure 4:
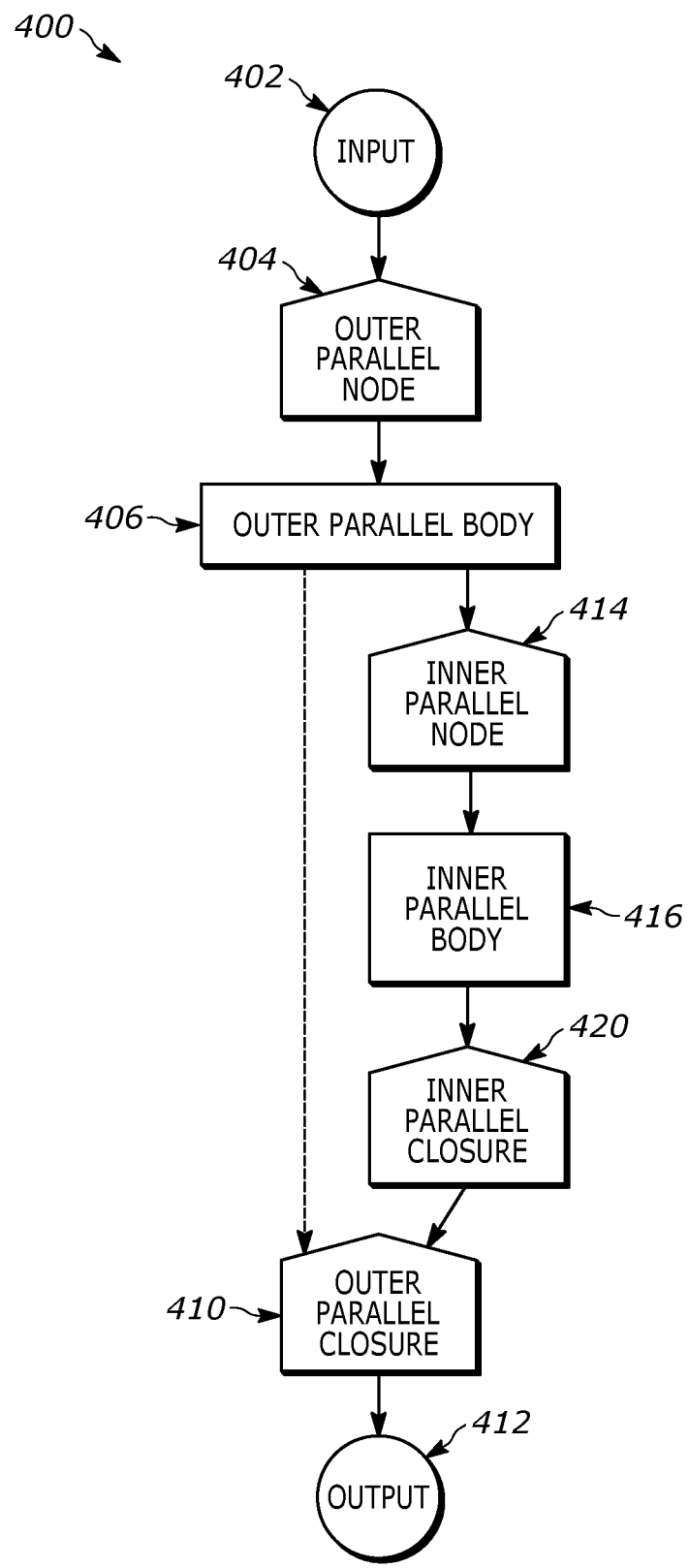
FIG. 4 illustrates an example of a nested parallel control flow graph 400 in accordance with disclosed embodiments.

FIG. 4 illustrates an example of a nested parallel control flow graph 400 in accordance with disclosed embodiments. ParCFG 400 is simple 2D parallel construct where the outer parallel construct contains an inner parallel construct. As in the example of FIG. 3, the primary process in this example includes an input vertex 402, a parallel vertex (illustrated here as an outer parallel vertex 404), a parallel body vertex (illustrated here as an outer parallel body vertex 406), a parallel closure vertex (illustrated here as an outer parallel closure vertex 410), and an output vertex 412.

In this example, the inner parallel construct/process includes an inner parallel vertex 414, an inner parallel body vertex 416, and an inner parallel closure vertex 420.

Each set of parallel vertices may contain unique sets of metadata to encapsulate patterns or attributes. Note how the outer parallel body (executable code) 404/406/410/412 triggers an inner parallel construct 414/416. The inner parallel closure vertex 420 is then connected to the outer parallel closure vertex 410.

Figure 5:
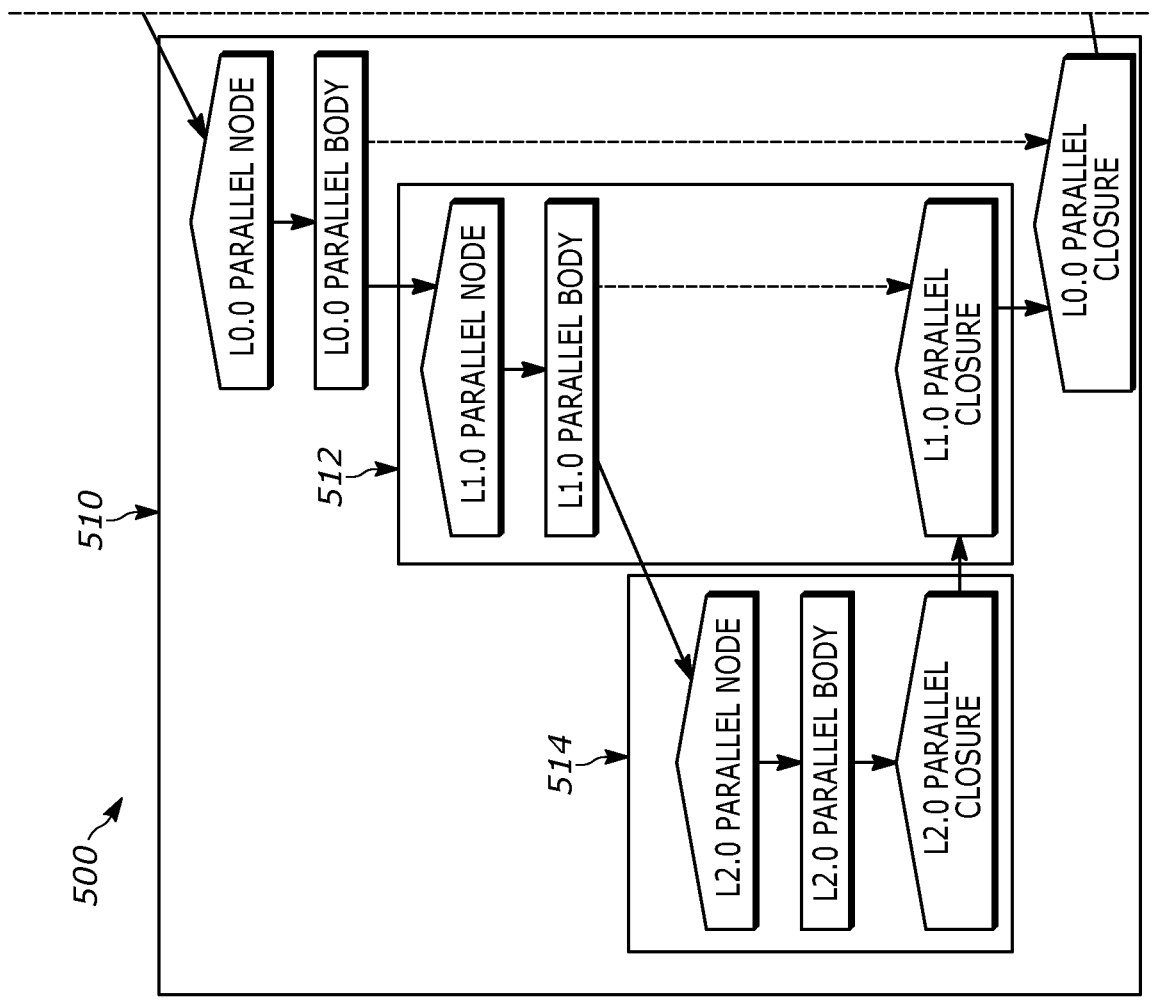
FIG. 5 illustrates an example of a more complex multi-nested ParCFG 500 for a more complex application.
Figure 5:
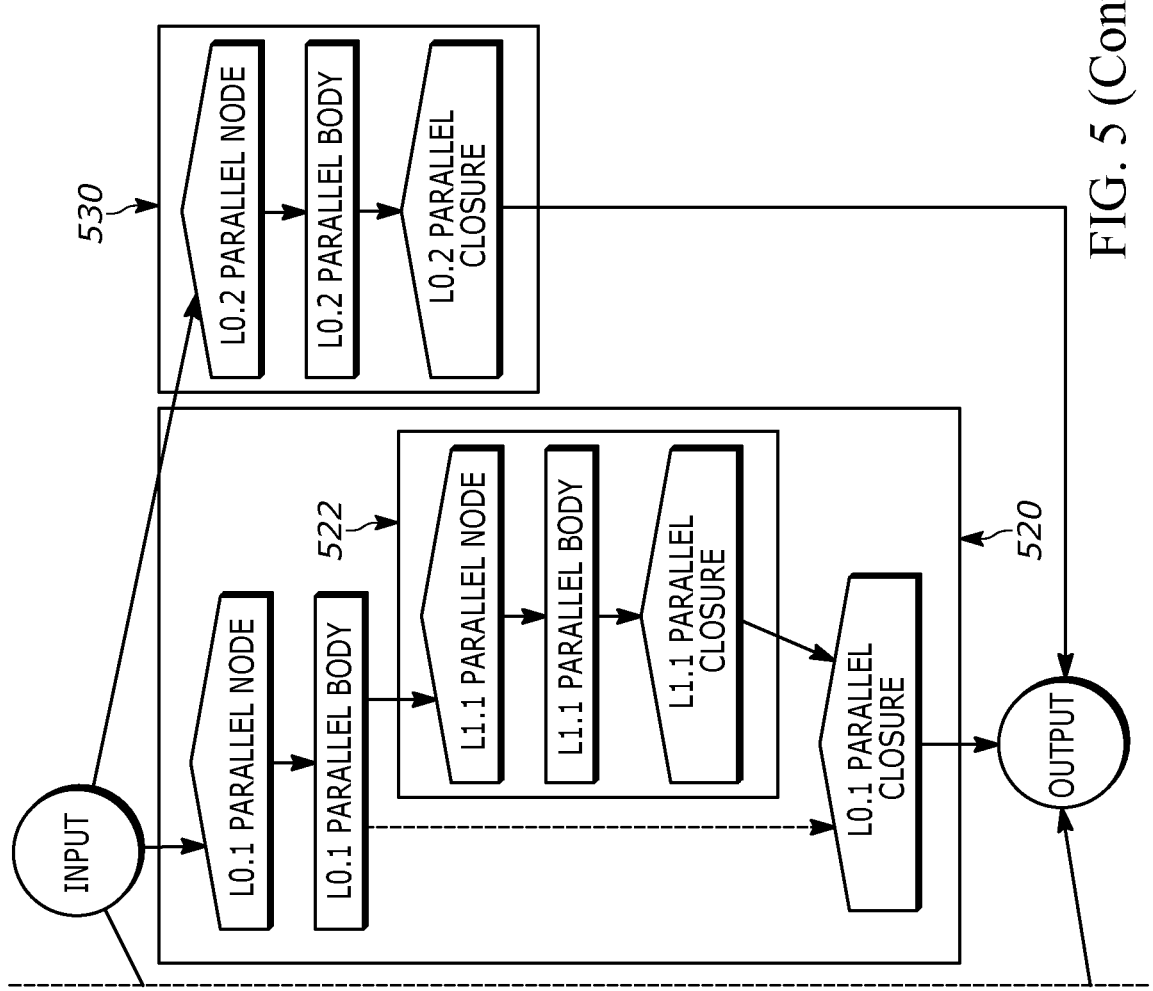

FIG. 5 illustrates an example of a more complex multi-nested ParCFG 500 for a more complex application. In ParCFG 500 has three outer parallel constructs (L0.0 510, L0.1 520, L0.2 530) that are each executed in order. However, the L0.0 510 and L0.1 520 parallel regions each contain nested sets of parallel constructs. L0.0 510 includes nested L1.0 512, which itself includes nested L2.0 514. L0.1 520 includes nested L1.1 522. The leftmost parallel construct L0.0 510 is a 3D parallel structure, the middle construct L0.1 520 is a 2D parallel construct and the rightmost construct L0.2 530 is a 1D parallel construct.

Parallel Control Flow Graph Construction

A system as disclosed herein can construct a ParCFG corresponding to an application. While most traditional HPC performance analysis tools operate at runtime, the systems and methods as disclosed herein can at the application compile time.

Specific embodiments can use the existing compiler infrastructure from the LLVM® set of compiler and toolchain technologies from the LLVM Foundation with an integrated library that directly attaches to the CLANG™ compiler and language frontend, also from the LLVM Foundation. Traditionally, the Clang compiles parses/lexes the language syntax then creates an Abstract Syntax Tree (AST) before generate target-agnostic LLVM intermediate representation. Disclosed embodiments can intercept the AST and performs a set of AST matchers in order to derive the template metaprogramming specific keyword syntax and parallel control flow. Note that, while the LLVM Foundation products are used in specific implementations and examples herein for purposes of illustration, disclosed embodiments can be used with other technologies, languages, compilers, and processes within the scope of the disclosure.

Figure 6:
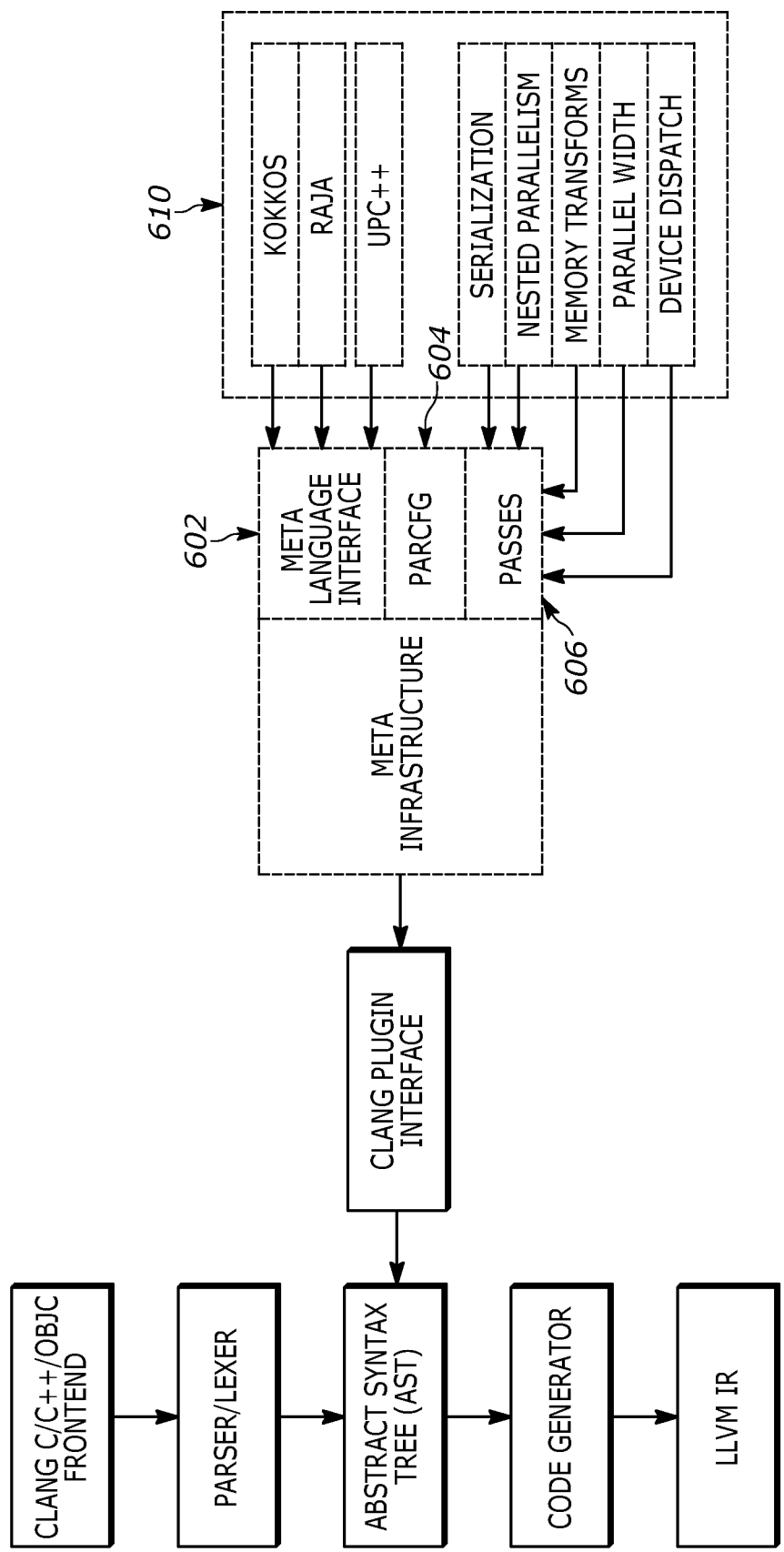
FIG. 6 illustrates an example of a compiler infrastructure using three functional components of disclosed embodiments.

FIG. 6 illustrates an example of a compiler infrastructure using three functional components of disclosed embodiments. The system abstracts the template metaprogramming language specific features and syntax of an application 610, using META language interface 602, such that the tooling may interpret a multitude of potential parallel constructs that include (but are not limited to) Kokkos, Raja, Legion and UPC++.

The second functional component is the ParCFG graph construction interfaces 604. The ParCFG graph construction interfaces 604 are coupled to the language interfaces so that the system can build the ParCFG graphs as the application is being compiled.

Finally, the system uses pass interfaces 606 to interpret the ParCFG graphs and discover a variety of functional, syntactical, and performance-related data using graph algorithms and methodologies as disclosed herein.

Parallel Control Flow Graph Analysis

The system can use the constructed ParCFG to analyze a parallel application at compile time. Since the ParCFG is constructed in the form of a directed acyclic graph, traversing the graph in order of parallel execution is a depth first search. Further, the relationship and hierarchy of the graph vertices and edges can be use by the system to determine one or more of the following:

Is the program syntactically correct? Has the program been constructed in a manner that is correct per the template metaprogramming syntactical definition?

Does the program generate sufficient parallelism in order to optimize the performance of a target platform?

Does the program utilize memory/data organization techniques/transforms that sufficiently utilize available memory resources and bandwidth?

Figure 7:
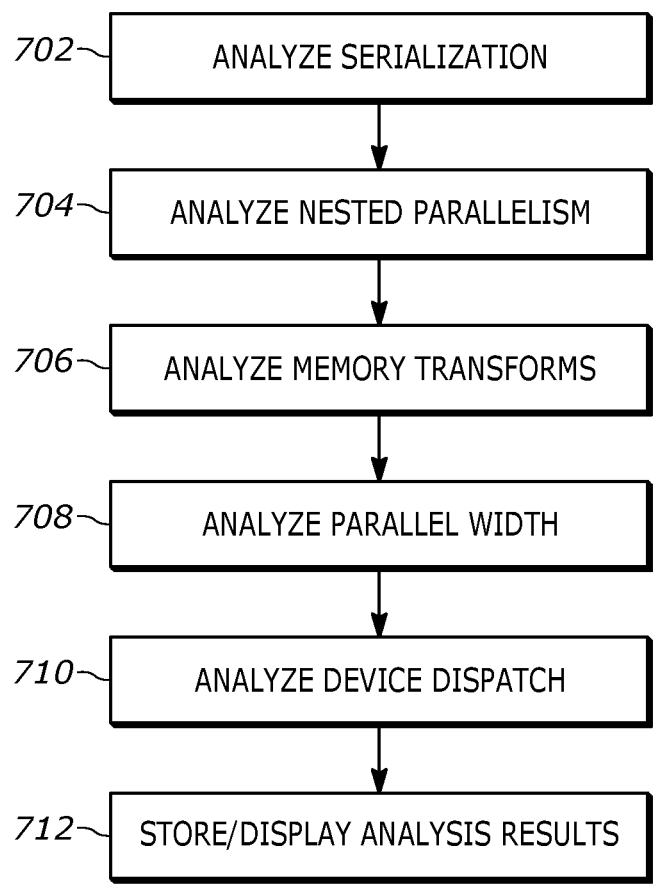
FIG. 7 illustrates an application analysis process in accordance with disclosed embodiments, which can be performed using the now-constructed ParCFG.

FIG. 7 illustrates an application analysis process 700 in accordance with disclosed embodiments, which can be performed using the now-constructed ParCFG. The system can use one or more of a set of initial analysis mechanisms to analyze the generated ParCFG as below.

The system can analyze serialization of the application (702). To do so, the system performs a depth-first search of the graph and determine if any parallel vertices are defined to execute sequentially (thus reducing potential parallelism).

The system can analyze nested parallelism of the application (704). To do so, the system performs a depth-first search and discover any nested parallel regions. If so, the system can execute the following actions:

The system records the depth of each nested parallel region (count the depth). If the depth is >3, the system can suggest fusing multiple, nested parallel vertices as most platforms only support 3D parallelism (at maximum)

The system records the parallel width attributes from multiple, nested regions. If the combined width of the nested regions is less than the pathological parallel width of the prescribed target device, the system can suggest fusing (combining) the two parallel constructs into a single large construct.

The system records any nested parallel regions that induce serialization or unnecessary barrier synchronizations that inhibit global parallel execution.

The system records the target device metadata attributes from each level of a target parallel region. If any N−1 level contains an orthogonal device type, the system can ensure that the spawning (N−1) device is permitted to initiate the $N^{th}$ level of parallelism. For example, most accelerator devices (GPUs, FPGAs) cannot spawn parallel constructs on the host CPU. Further, any devices that are designated utilize vector style parallelism in the metadata, cannot spawn nested parallel regions.

The system records the parallel patterns of each nested region. If parent vertices contain child parallel vertices that both use collectives (parallel reduce patterns), the system can warn the user.

Returning the to the main process of FIG. 7, the system can analyze memory transforms of the application (706). To do so, the system can perform a depth-first search and discover each of the metadata attributes associated with memory transformations. The system can then compare the memory transformation data to the associated target device construct and determine if the memory organization is orthogonal to the target device.

The system can analyze parallel width of the application (708). To do so, the system performs a depth-first search and determines if any encountered parallel nodes utilize a small degree of parallelism. The system can then compares the encountered parallel width attributes using the prescribed parallel pattern to the device-specific pathological parallelism. E.g., CPUs have much smaller degrees of parallelism than GPUs.

The system can analyze device dispatch of the application (710). To do to, the system performs a depth-first search and records the memory utilization and dependencies between each parallel node, e.g., as represented in a DAG. If multiple parallel vertices at a given level do not contain any inherent data dependencies, the system can mark the vertices as candidates for asynchronous/concurrent parallel execution.

The system then can store, display, or otherwise produce the results of the analysis (712). The analysis results can be used by a user or programmer to review and improve the application code for greater efficiency and parallelism, and can be used by the system to perform actions as described herein.

The analysis results can include the specific performance related issue(s) that occur in the set or sets of parallel code constructs. The analysis results not only inform the user of the specific issue found during analysis, but can also identify the specific line of code that is derived directly from the compiled application. This is unique from other such tools in that the user is no longer required to manually interpret results and attempt to derive the specific locality (in the source code) of the issue. Examples of messages in the analysis results could include:

NestedPar: Found inverted parallel regions, consider region fusion or invert the structure; Parent region at: lulesh.cc:657:6; Child region at: lulesh.cc:679:8

ParWidth: Found parallel host node with insufficient parallelism (0) at: lulesh.cc:2001:3

ParWidth: Found parallel host node with insufficient parallelism (0) at: lulesh.cc:1954:3

In addition to generating, storing, and/or displaying analysis results, the system can perform a number of actions to automatically improve the target application. During or subsequent to performing the analysis actions described with respect to FIG. 7, the system may automatically correct the behavior and/or structure of the target application. Correcting the target application can include modifying the graph structure (as described and illustrated herein) and subsequently modifying the associated abstract syntax tree (AST) in order to match the associated graph structure. In this manner, if disclosed system detects a safe way to modify the parallel structure, it can do so automatically, without user intervention.

Figure 8:
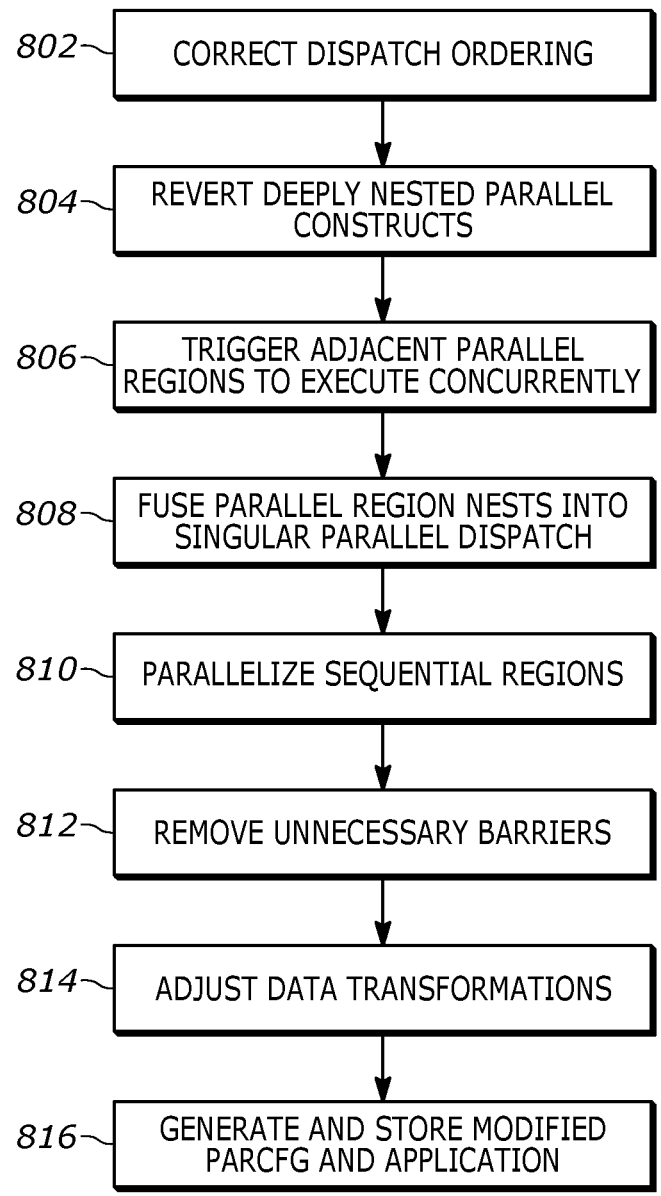
FIG. 8 illustrates an example of a process performed by the system to modify a ParCFG for a target application, in accordance with disclosed embodiments.

FIG. 8 illustrates an example of a process performed by the system to modify a ParCFG for a target application, in accordance with disclosed embodiments. Note that any of the processes below may be performed on a portion of the ParCFG, and thereafter the overall modified ParCFG may be generated separately.

The system can automatically correct dispatch ordering (accelerator to device) (802). When system identifies, during the analysis, nested sets of parallel dispatches where the outer target execution devices (DeviceTarget) are not permitted to initiate parallel workloads to the target execution devices contained in one or more inner parallel constructs, the system can automatically invert the graph structure to produce a correctly nested set of device constructs. This would occur, for example, if the original target application were to specify an outer parallel region to execute on an accelerator device such as a GPU and an inner parallel region to execute on the host CPU. Since most accelerators do not have the ability to semantically or efficiently initiate parallel constructs back to the host CPU(s), The system can automatically invert the graph structure such that the host initiates the outer parallel region, which subsequently spawns an inner parallel region using the target accelerator.

Figure 9A:
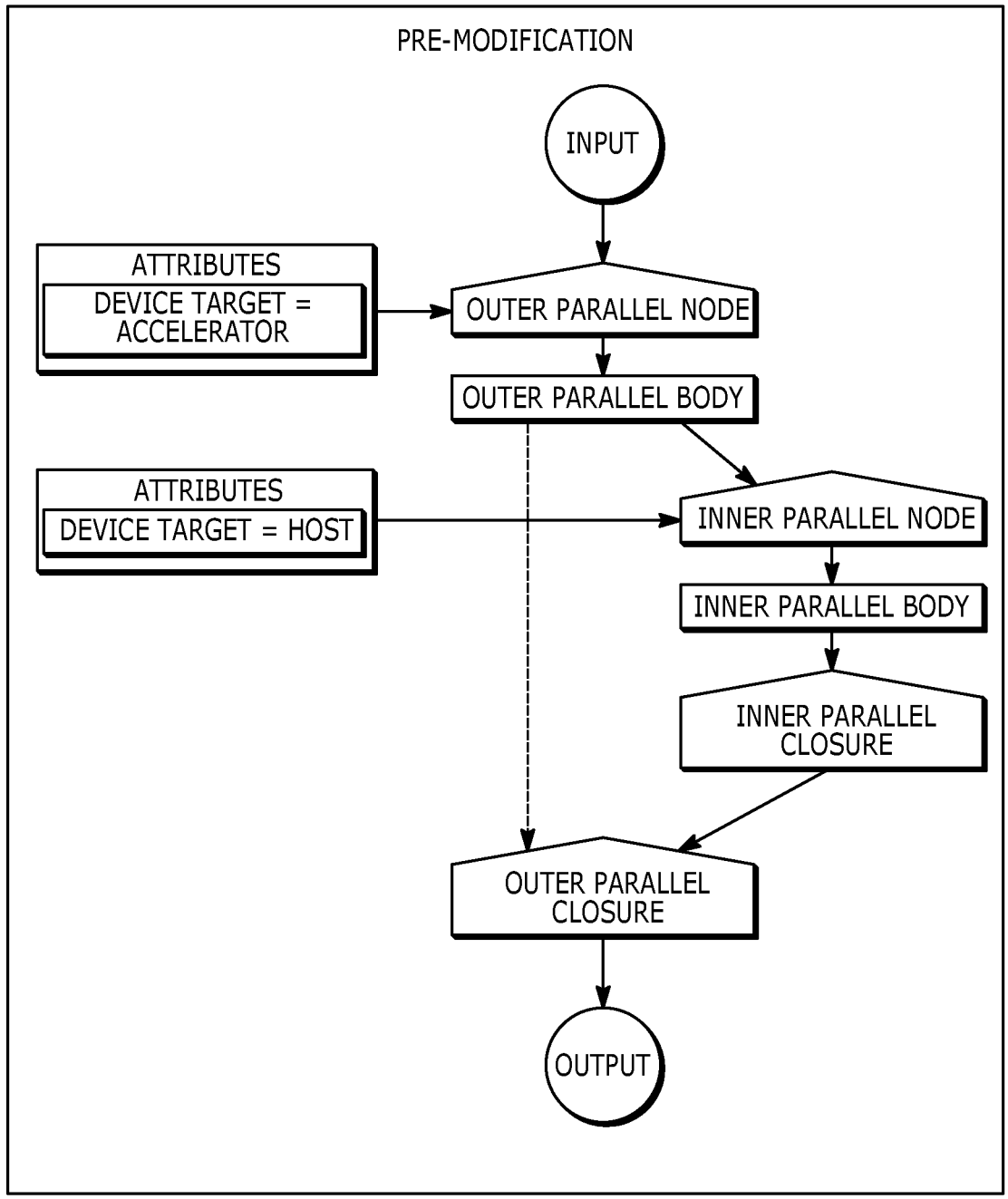
FIG. 9A illustrates an example of a ParCFG before the system corrects dispatch ordering.
Figure 9B:
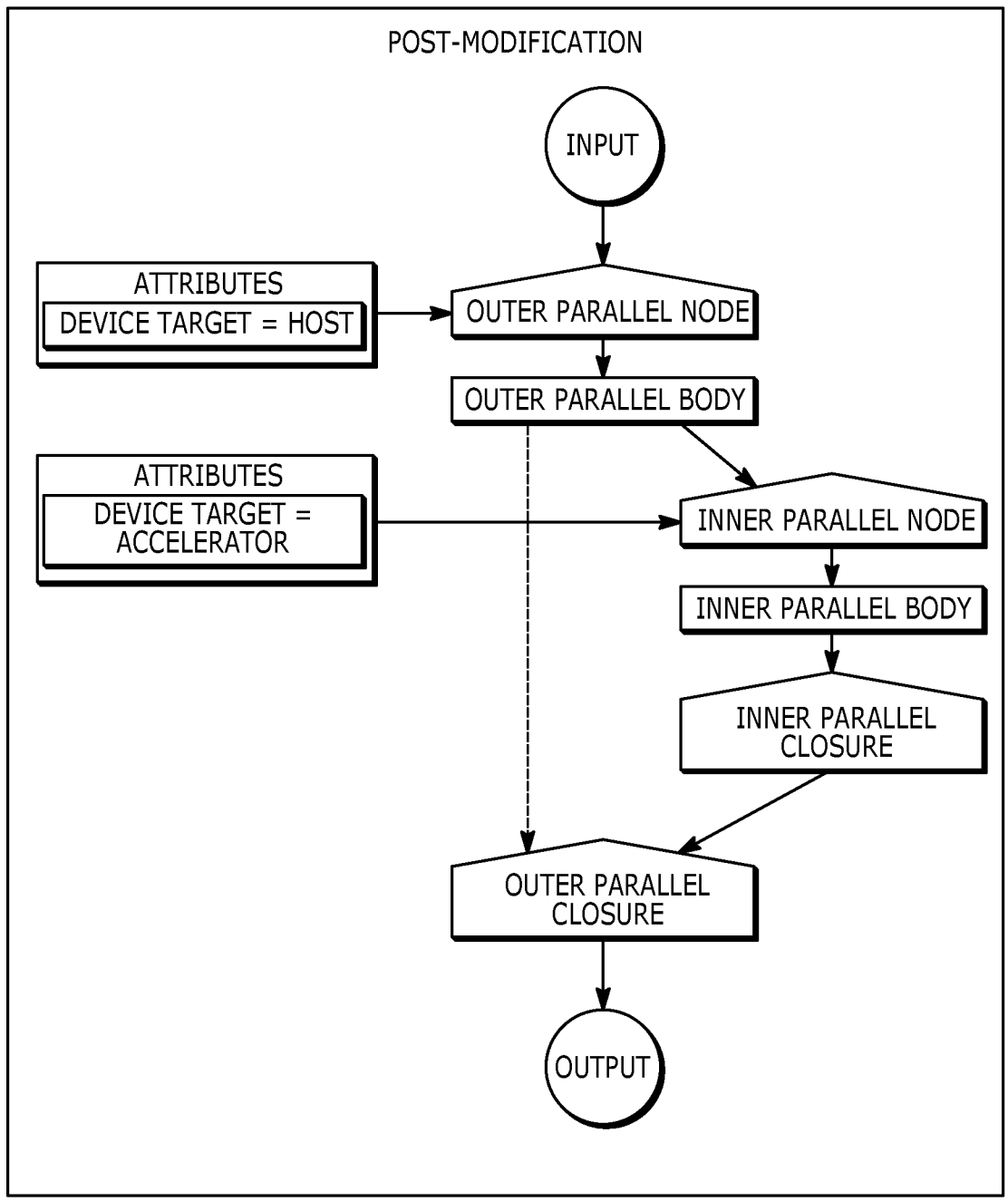
FIG. 9B illustrates an example of a corresponding ParCFG after the system corrects dispatch ordering.

FIG. 9A illustrates an example of a ParCFG before the system corrects dispatch ordering; FIG. 9B illustrates an example of a corresponding ParCFG after the system corrects dispatch ordering.

Returning to the process of FIG. 8, the system can automatically revert deeply nested parallel constructs (>3 nests) to sequential operation (804). When system identifies, during the analysis, nested sets of parallel regions where the depth of the nesting is greater than 3, the system can automatically "fold" the innermost parallel constructs into the $3^{rd}$ parallel region. Most modern HPC platforms that utilize combinations of host processors and accelerators (GPUs, FPGAs, etc.) only support three levels of parallel regions. These generally map to 1) host CPU parallelism 2) accelerator parallelism and 3) accelerator SIMD execution (vectorization). Given this, deeply nesting parallel regions where the depth is >3, in current systems, induce a reduction in performance due to the dispatch overhead of each subsequent nest. For this reason, for each nested parallel region N with depth D, the system can select all interior nests at depth d>3 and fold them into the parallel nest at depth d=3.

Figure 10A:
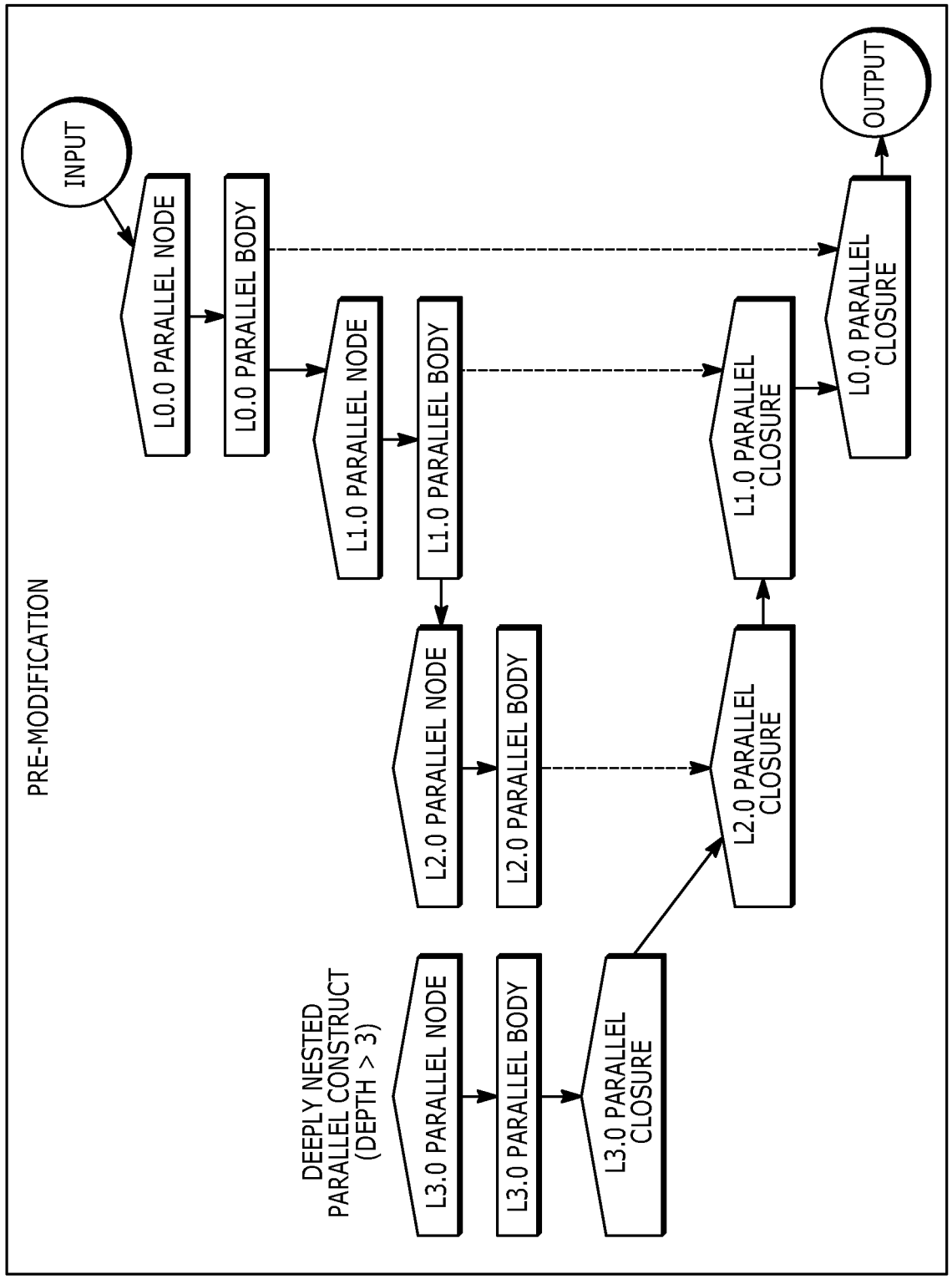
FIG. 10A illustrates an example of a ParCFG before the system reverts deeply nested parallel constructs to sequential operation.
Figure 10B:
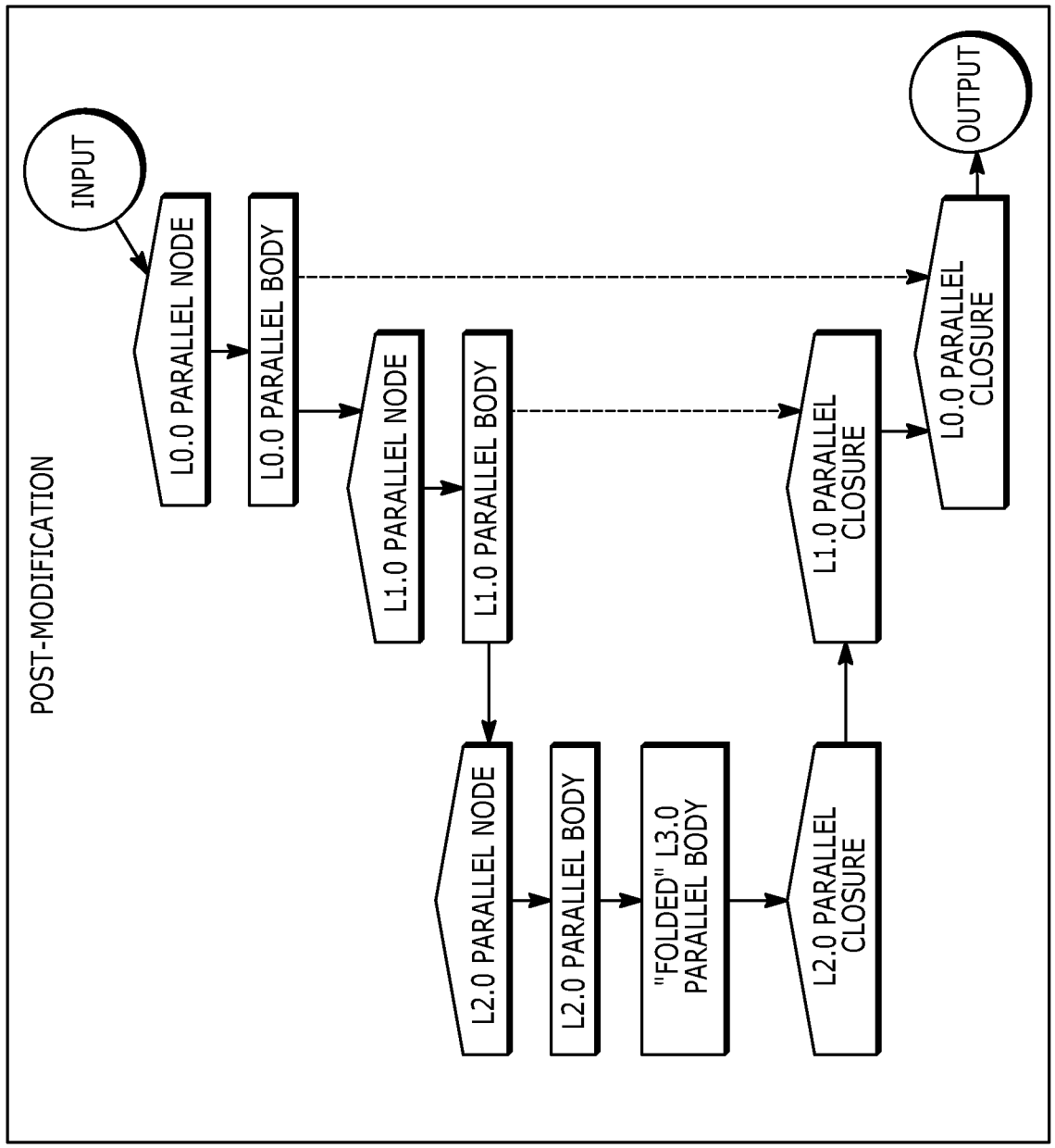
FIG. 10B illustrates an example of a corresponding ParCFG after the system reverts deeply nested parallel constructs to sequential operation.

FIG. 10A illustrates an example of a ParCFG before the system reverts deeply nested parallel constructs to sequential operation; FIG. 10B illustrates an example of a corresponding ParCFG after the system reverts deeply nested parallel constructs to sequential operation.

Returning to the process of FIG. 8, the system can automatically trigger adjacent parallel regions marked at the same level and having no data dependencies to execute concurrently (806). During the analysis, using the same depth-first search methods, the system may automatically identify dependencies between multiple, parent parallel regions. If the data and associated memory transformations do not induce a dependent graph edge, the system can mark and subsequently execute both of the parent parallel regions concurrently.

Figure 11:
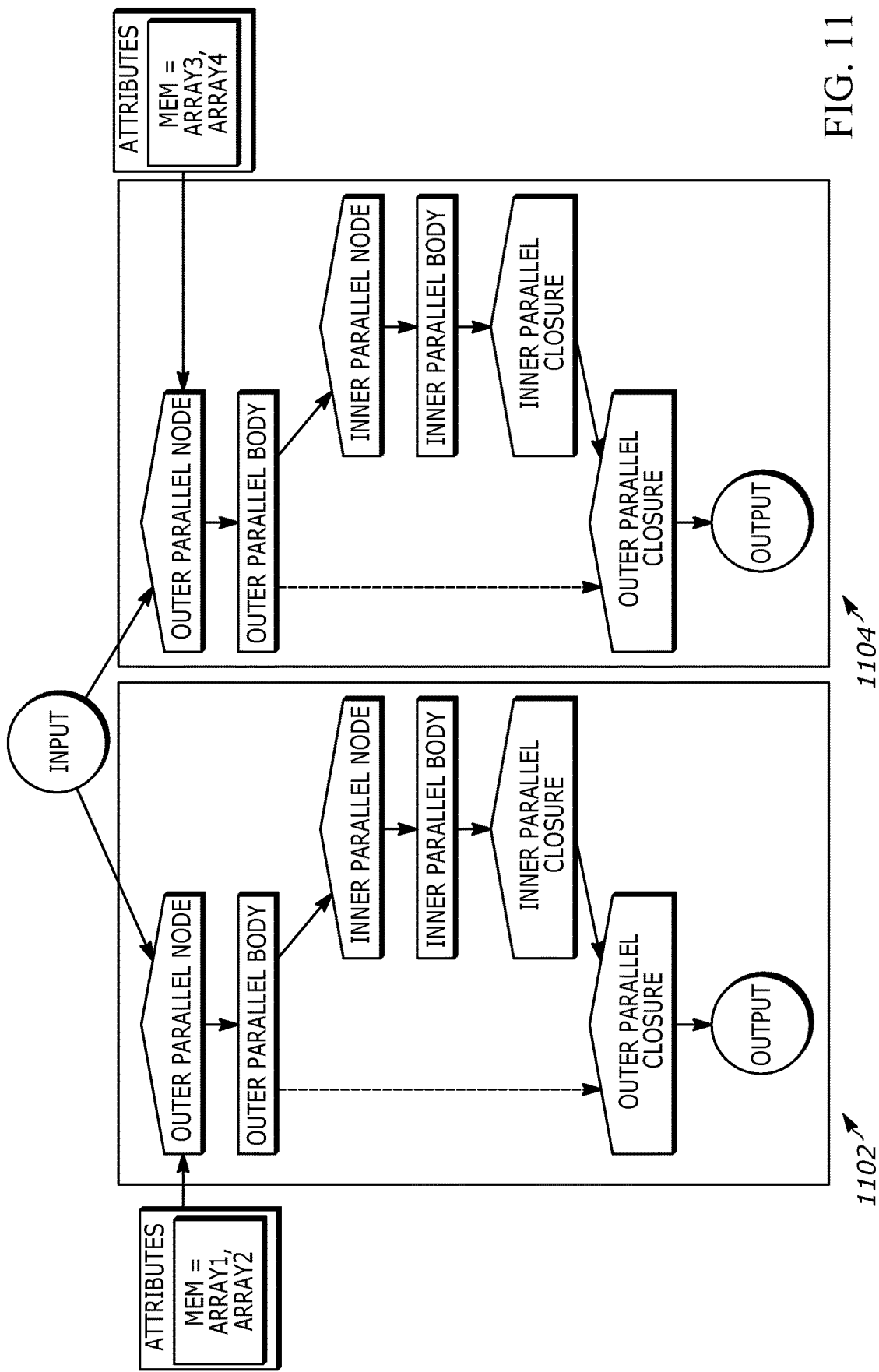
FIG. 11 illustrates an example of a ParCFG in accordance with disclosed embodiments, in which the system has identified two processes in the structure that do not have data dependencies and marks the two processes to be executed in parallel.

FIG. 11 illustrates an example of a ParCFG in accordance with disclosed embodiments, in which the system has identified two processes 1102 and 1104 in the structure that do not have data dependencies and marks the two processes to be executed in parallel.

Returning to the process of FIG. 8, the system can automatically fuse multiple parallel region nests into a singular parallel dispatch (808), thus reducing dispatch latency and increasing parallelism. This often occurs when nested parallel regions contain a small degree of parallelism. If, during the analysis, the system determines that a parent region and associated child region have a small degree of parallelism, the system can perform a region fusion operation that creates a single, larger parallel region using similar attributes, but utilizes more hardware resources. The goal of this region fusion is the ensure that the parallel region dispatch latency is minimized.

Figure 12A:
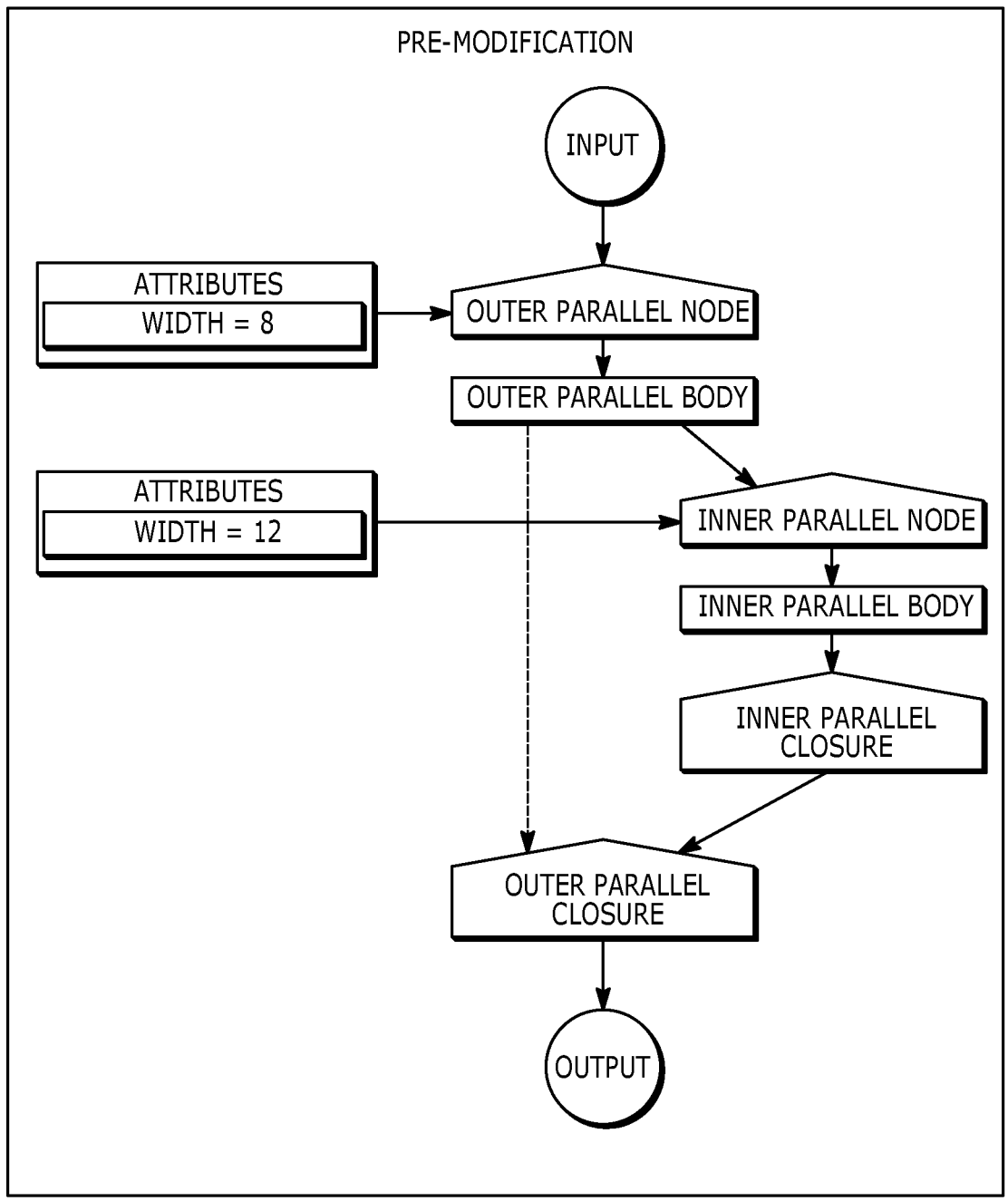
FIG. 12A illustrates an example of a ParCFG before the system fuses multiple parallel region nests into a singular parallel dispatch.
Figure 12B:
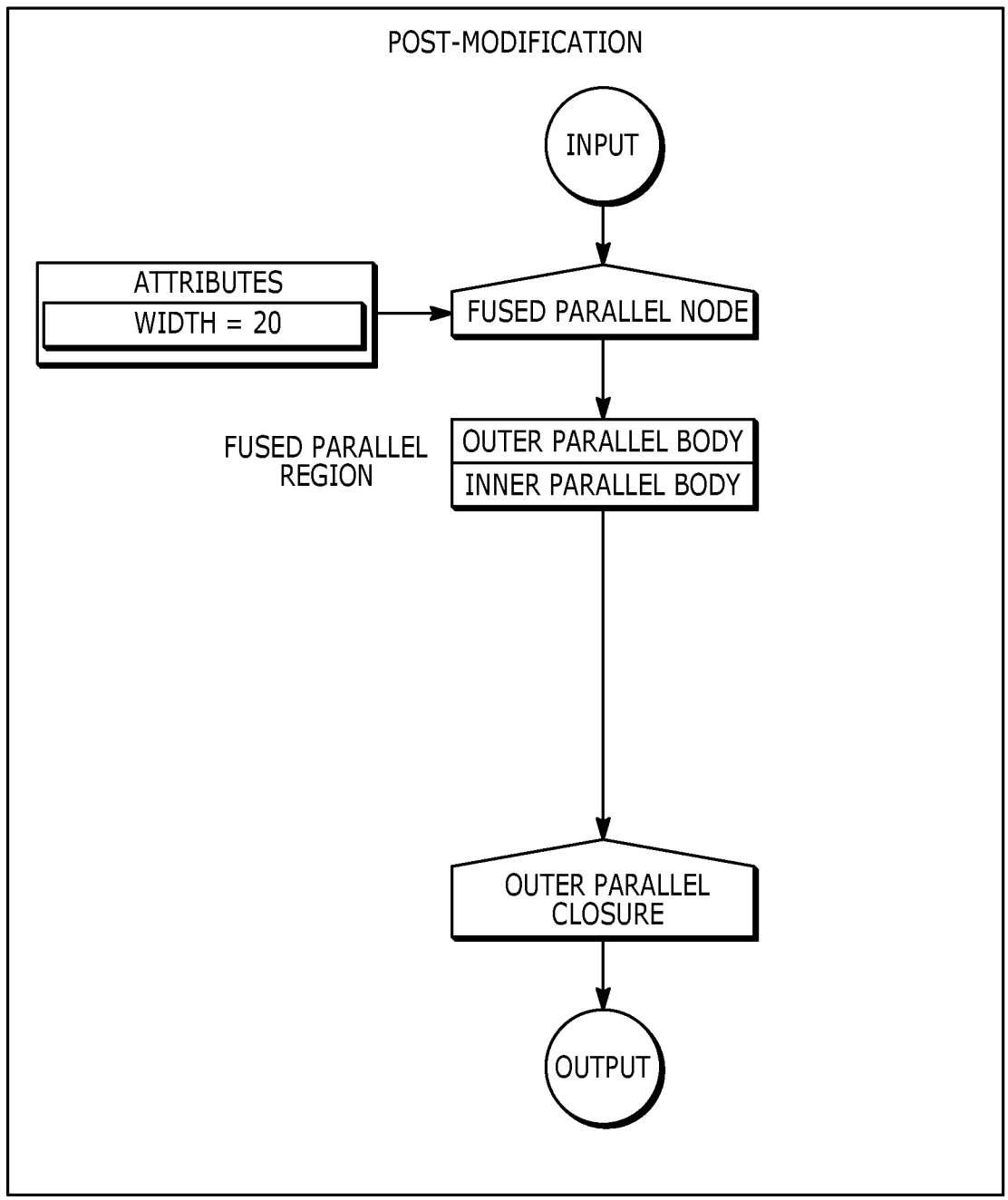
FIG. 12B illustrates an example of a corresponding ParCFG after the system fuses multiple parallel region nests into a singular parallel dispatch.

FIG. 12A illustrates an example of a ParCFG before the system fuses multiple parallel region nests into a singular parallel dispatch; FIG. 12B illustrates an example of a corresponding ParCFG after the system fuses multiple parallel region nests into a singular parallel dispatch.

Returning to the process of FIG. 8, the system can automatically parallelize sequential regions that have no external data dependencies (810). If the original target specifies multiple parallel regions within a parent parallel region construct that is identified by the system during the analysis, the system can parallelize the two sequential regions to execute concurrently if there are no inherent data dependencies. Note that, preferably, the system does not parallelize the sequential region in itself as this often leads to numerical instabilities.

Figure 13:
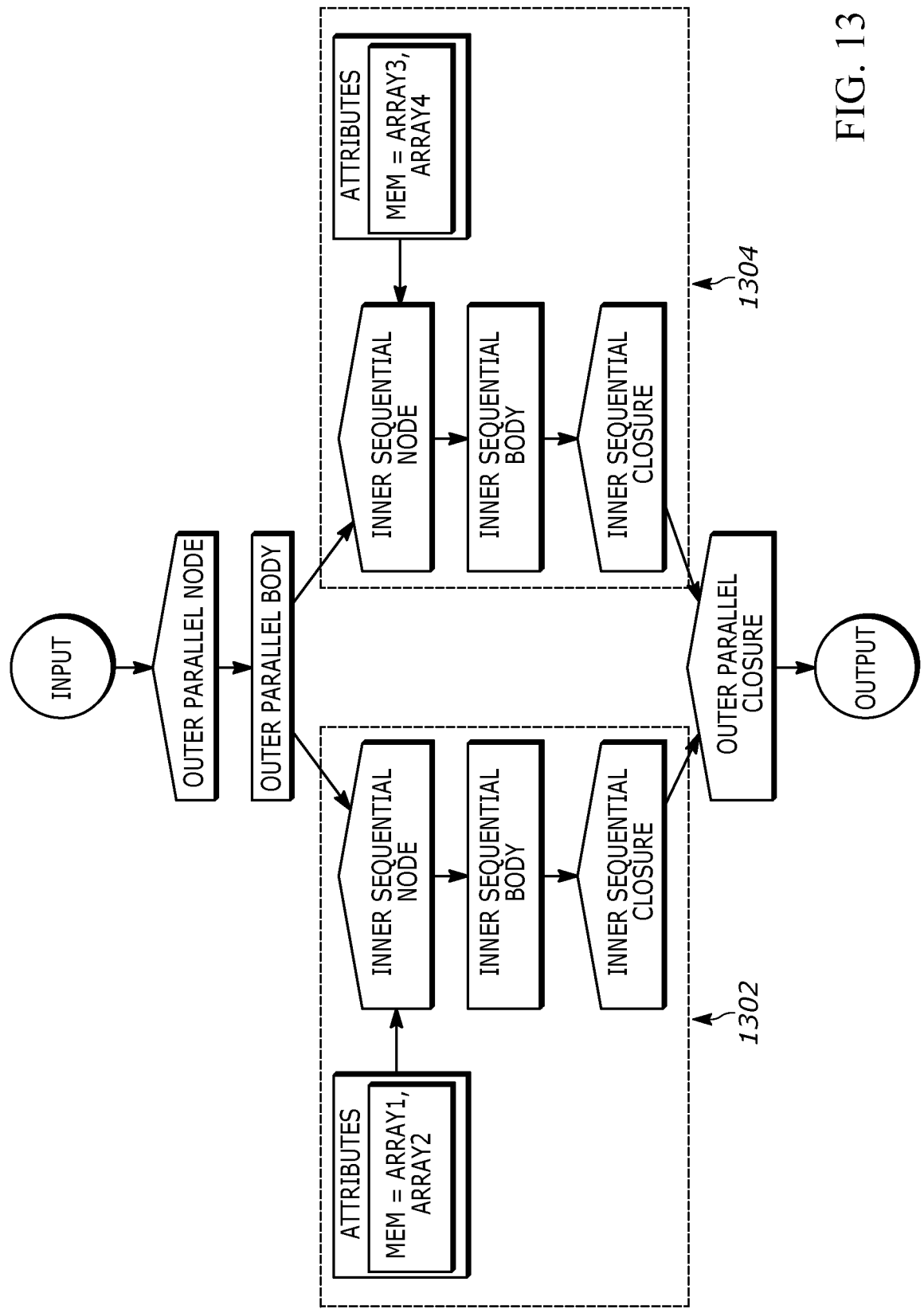
FIG. 13 illustrates an example of a ParCFG in accordance with disclosed embodiments, in which the system has identified two otherwise-sequential processes in the structure that do not have parallel data dependencies and marks the two processes to be executed in parallel.

FIG. 13 illustrates an example of a ParCFG in accordance with disclosed embodiments, in which the system has identified two otherwise-sequential processes 1302 and 1304 in the structure that do not have parallel data dependencies and marks the two processes to be executed in parallel.

Returning to the process of FIG. 8, the system can automatically remove unnecessary barrier synchronization primitives when no adjacent data dependencies exist (812). Often, programmers and their applications will explicitly utilize barrier synchronization constructs between parallel regions in order to ensure memory consistency. However, barrier synchronizations induce hard, sequential points in parallel programs and require a large degree of time/latency to perform on scalable systems. If the system determines, during the analysis, that there are no inherent data dependencies across these barrier synchronization points, then they are flagged for removal as there are no numerical consistency issues to immediately begin executing the child parallel region. As a result, the explicit barrier synchronization can be removed.

Figure 14A:
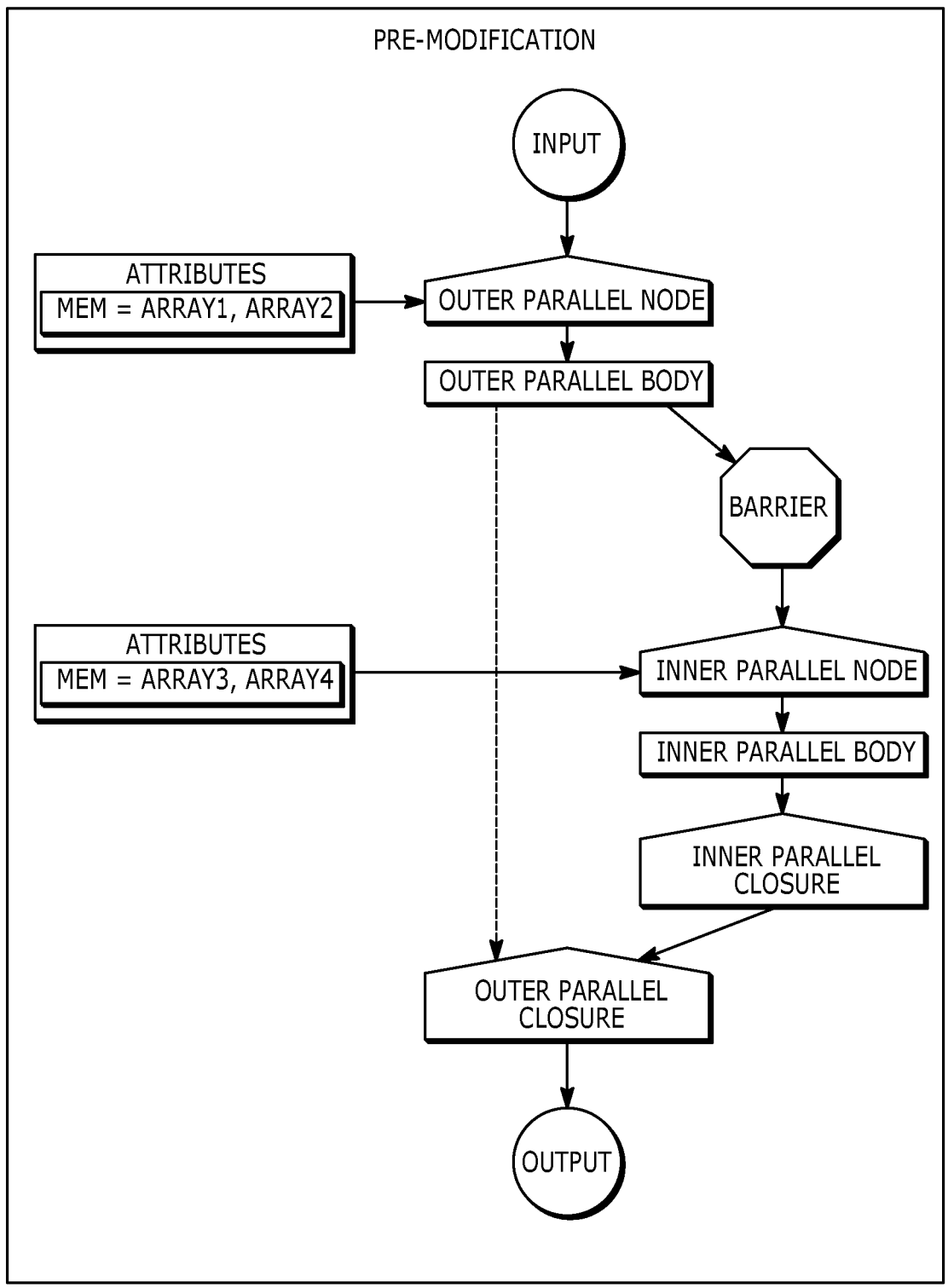
FIG. 14A illustrates an example of a ParCFG before the system removes unnecessary barrier synchronization primitives when no adjacent data dependencies exist.
Figure 14B:
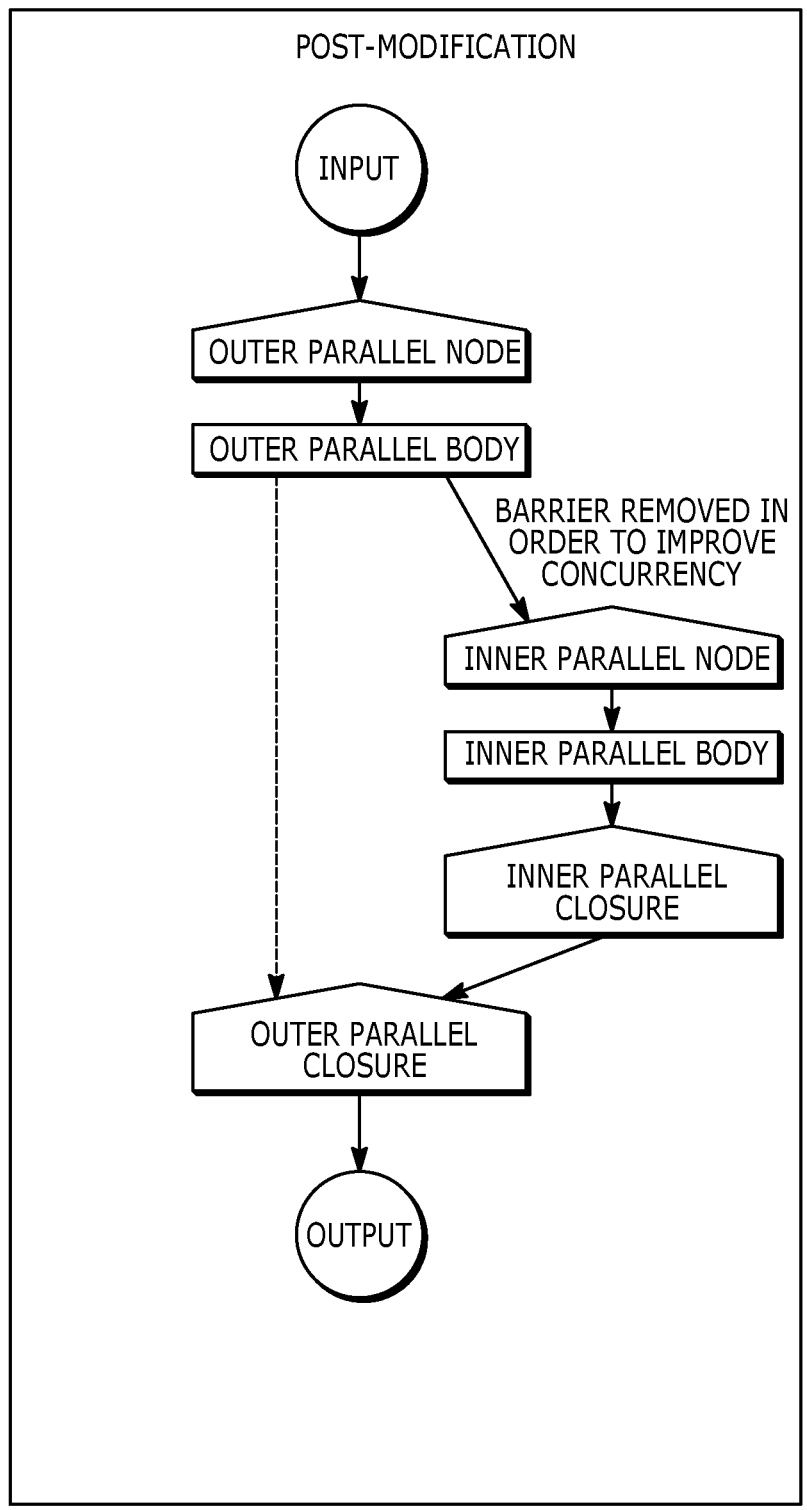
FIG. 14B illustrates an example of a corresponding ParCFG after the system removes unnecessary barrier synchronization primitives.

FIG. 14A illustrates an example of a ParCFG before the system removes unnecessary barrier synchronization primitives when no adjacent data dependencies exist; FIG. 14B illustrates an example of a corresponding ParCFG after the system removes unnecessary barrier synchronization primitives.

Returning to the process of FIG. 8, the system can automatically adjust data transformations in order to ensure correct memory alignment and layout on the target execution device (814). Often, programmers and applications specify large data blocks in a logical data structure that is not necessary compatible with the target memory infrastructure or computing target. For example, one common mistake is to specify matrices in row ordering. If the target device architecture performs memory accesses in a manner that is more conducive to column matrix ordering, then the disclosed systems and methods may perform an implicit data transform operation immediately prior to the target parallel region. In this manner, the data at rest is not modified, rather, the system modify the organization and alignment of the data such that the memory access performance is higher than what of which the original application was capable.

Figure 15A:
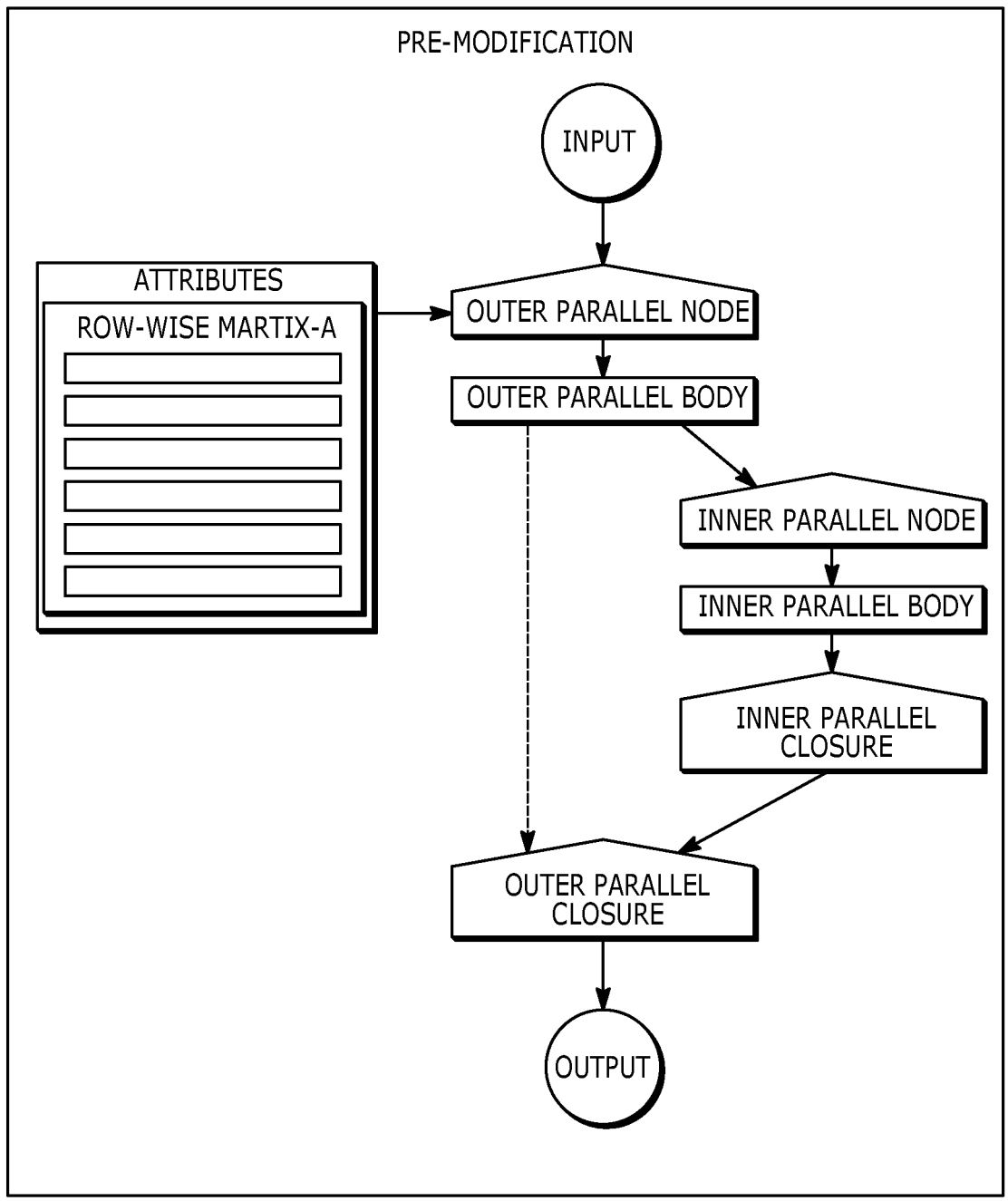
FIG. 15A illustrates an example of a ParCFG before the system adjusts data transformations in order to ensure correct memory alignment and layout on the target execution device.
Figure 15B:
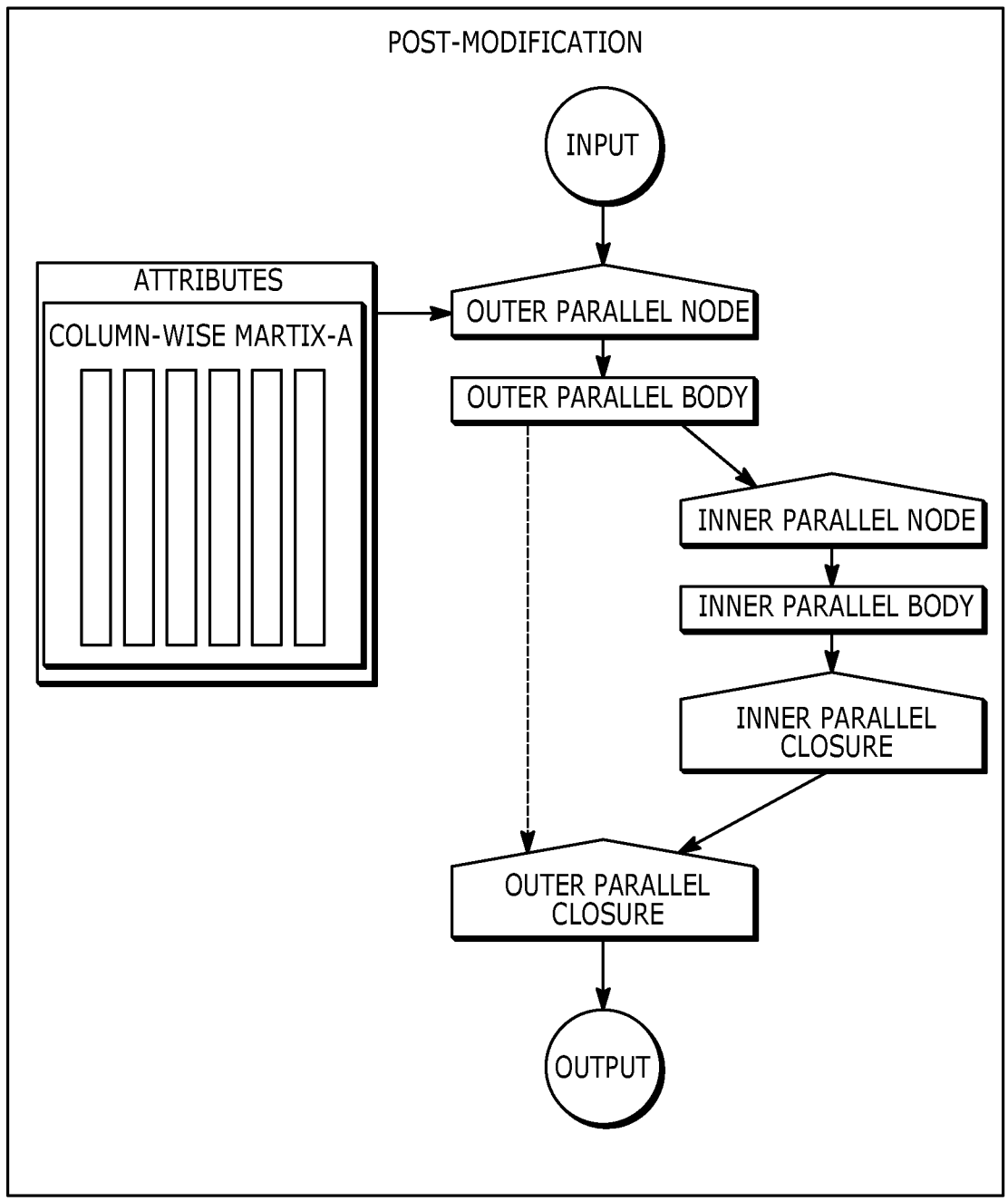
FIG. 15B illustrates an example of a corresponding ParCFG after the system adjusts these data transformations.

FIG. 15A illustrates an example of a ParCFG before the system adjusts data transformations in order to ensure correct memory alignment and layout on the target execution device; FIG. 15B illustrates an example of a corresponding ParCFG after the system adjusts these data transformations.

Returning to the process of FIG. 8, the system can generate and store the modified ParCFG for the application based on any of the actions taken in the process of FIG. 8. Further, the system can generate and store a modified application according to the modified ParCFG. The modified application is more efficient and effective based on increased parallelism and reduced inefficiencies produced by the actions taken by the system.

Figure 16:
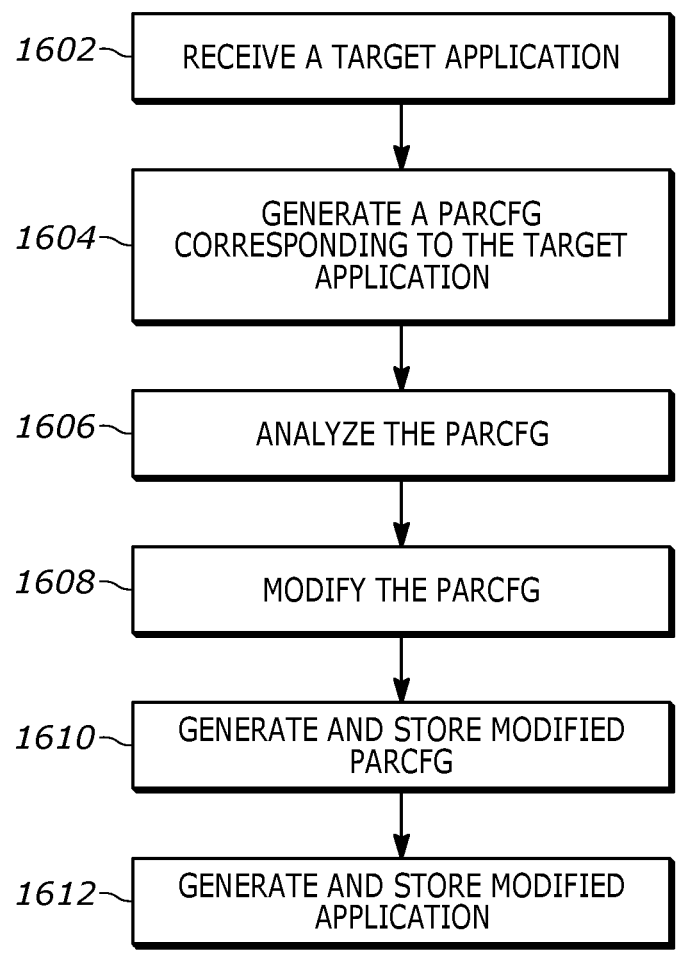
FIG. 16 illustrates a high-level process in accordance with disclosed embodiments.

FIG. 16 illustrates a high-level process in accordance with disclosed embodiments, performed by one or more computer systems as disclosed herein, referred to generically as "the system." The process of FIG. 16 can include any of the processes and actions described herein, singularly or in various combinations, to perform the actions described below.

The system receives a target application to be improved (1602). "Receiving," as used herein, can include loading from storage, receiving from another device or process, receiving via an interaction with a user, or otherwise.

The system generates a parallel control flow graph corresponding to the target application (1604).

The system analyzes the ParCFG (1606).

The system modifies the ParCFG according to the analysis (1608).

The system generates and stores the modified ParCFG for the target application (1610). This may include generating an overall modified ParCFG from modified portions of the ParCFG.

The system can generate and store a modified application according to the modified ParCFG (1612).

Of course, those of skill in the art will recognize that, unless specifically indicated or required by the sequence of operations, certain steps in the processes described above may be combined, omitted, performed concurrently or sequentially, or performed in a different order.

Those skilled in the art will recognize that, for simplicity and clarity, the full structure and operation of all data processing systems or computer systems suitable for use with the present disclosure is not being depicted or described herein. Instead, only so much of a computer system as is unique to the present disclosure or necessary for an understanding of the present disclosure is depicted and described. The remainder of the construction and operation of the computer systems described herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

The following documents are incorporated by reference:

J. Bachan, S. B. Baden, S. Hofmeyr, M. Jacquelin, A. Kamil, D. Bonachea, P. H. Hargrove, and H. Ahmed, "UPC++: a high-performance communication framework for asynchronous computation," in 2019 IEEE International Parallel and Distributed Processing Symposium (IPDPS), 2019, pp. 963-973.

J. Bachan, D. Bonachea, and A. Kamil, "UPC++ v1.0 Specification Revision 2020.3.0," Tech. Rep., March 2020. [Online]. Available at time of filing from bitbucket.org/berkeleylab/upcxx/downloads/upcxx-spec-2020.3.0.pdf.

Carter Edwards, H., Trott, Christian R., and Sunderland, Daniel. *Kokkos: Enabling manycore performance portability through polymorphic memory access patterns.* United States: N. p., 2014. Available at time of filing from sciencedirect.com/science/article/am/pii/S0743731514001257.

E. Slaughter, W. Lee, S. Treichler, M. Bauer, and A. Aiken, "Regent: A high-productivity programming language for HPC with logical regions," in Proceedings of the International Conference for High Performance Computing, Networking, Storage and Analysis, ser. SC '15. New York, N.Y., USA: Association for Computing Machinery, 2015. Available at time of filing from doi.org/10.1145/2807591.2807629.

E. Slaughter, "Regent: A high-productivity programming language for implicit parallelism with logical regions," Ph. D. dissertation, Stanford University, 2017.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method for analyzing and improving a target computer application, the method performed by at least one computer system having a processor and an accessible memory, the method comprising:
   receiving the target application by the computer system;
   generating, by the computer system, a parallel control flow graph (ParCFG) corresponding to the target application;
   analyzing the ParCFG by the computer system;
   generating a modified ParCFG to correct dispatch ordering; and
   storing the modified ParCFG for the target application by the computer system.

2. The method of claim 1, further comprising generating and storing, by the computer system, a modified application according to the modified ParCFG.

3. The method of claim 1, wherein the ParCFG is a directed acyclic graph including vertices and directed edges that represent sequential and parallel processes performed by the target application.

4. The method of claim 3, wherein at least one vertex includes metadata attributes describing at least one of execution type, parallel width, device type, memory type, or memory transforms.

5. The method of claim 1, wherein analyzing the ParCFG includes at least one of analyzing serialization of the application, analyzing nested parallelism of the application, analyzing memory transforms of the application, analyzing parallel width of the application, or analyzing device dispatch of the application.

6. The method of claim 1, wherein generating the modified ParCFG further includes at least one of reverting deeply nested parallel constructs to sequential operation, triggering adjacent parallel regions to execute concurrently, fusing multiple parallel region nests into a singular parallel dispatch, parallelizing sequential regions that have no external data dependencies, removing unnecessary barrier synchronization primitives, or adjusting data transformations to ensure correct memory alignment and layout.

7. A computer system, comprising:
    at least one processor; and
    a memory accessible by the at least one processor and storing executable code, wherein the at least one processor is configured to execute the executable code to:
        receive a target application;
        generate a parallel control flow graph (ParCFG) corresponding to the target application;
        analyze the ParCFG;
        generate a modified ParCFG to correct dispatch ordering; and
        store the modified ParCFG for the target application by the computer system.

8. The computer system of claim 7, wherein the at least one processor is further configured to execute the executable code to generate and store a modified application according to the modified ParCFG.

9. The computer system of claim 7, wherein the ParCFG is a directed acyclic graph including vertices and directed edges that represent sequential and parallel processes performed by the target application.

10. The computer system of claim 9, wherein at least one vertex includes metadata attributes describing at least one of execution type, parallel width, device type, memory type, or memory transforms.

11. The computer system of claim 7, wherein analyzing the ParCFG includes at least one of analyzing serialization of the application, analyzing nested parallelism of the application, analyzing memory transforms of the application, analyzing parallel width of the application, or analyzing device dispatch of the application.

12. The computer system of claim 7, wherein generating the modified ParCFG further includes at least one of reverting deeply nested parallel constructs to sequential operation, triggering adjacent parallel regions to execute concurrently, fusing multiple parallel region nests into a singular parallel dispatch, parallelizing sequential regions that have no external data dependencies, removing unnecessary barrier synchronization primitives, or adjusting data transformations to ensure correct memory alignment and layout.

13. A non-transitory computer-readable medium encoded with executable instructions which, when executed by one or more processors, cause the one or more processors to:
    receive a target application;
    generate a parallel control flow graph (ParCFG) corresponding to the target application;
    analyze the ParCFG;
    generate a modified ParCFG to correct dispatch ordering; and
    store the modified ParCFG for the target application by the computer system.

14. The non-transitory computer-readable medium of claim 13, wherein the executable instructions further cause the one or more processors to generate and store a modified application according to the modified ParCFG.

15. The non-transitory computer-readable medium of claim 13, wherein the ParCFG is a directed acyclic graph including vertices and directed edges that represent sequential and parallel processes performed by the target application.

16. The non-transitory computer-readable medium of claim 15, wherein at least one vertex includes metadata attributes describing at least one of execution type, parallel width, device type, memory type, or memory transforms.

17. The non-transitory computer-readable medium of claim 13, wherein analyzing the ParCFG includes at least one of analyzing serialization of the application, analyzing nested parallelism of the application, analyzing memory transforms of the application, analyzing parallel width of the application, or analyzing device dispatch of the application.

18. The non-transitory computer-readable medium of claim 13, wherein generating the modified ParCFG further includes at least one of reverting deeply nested parallel constructs to sequential operation, triggering adjacent parallel regions to execute concurrently, fusing multiple parallel region nests into a singular parallel dispatch, parallelizing sequential regions that have no external data dependencies, removing unnecessary barrier synchronization primitives, or adjusting data transformations to ensure correct memory alignment and layout.

* * * * *